(12) United States Patent
Zhang et al.

(10) Patent No.: US 12,154,189 B2
(45) Date of Patent: Nov. 26, 2024

(54) SYSTEMS AND METHODS FOR FACIAL ATTRIBUTE MANIPULATION

(71) Applicant: QUALCOMM Incorporated, San Diego, CA (US)

(72) Inventors: Junkang Zhang, San Diego, CA (US); Zhen Wang, San Diego, CA (US); Lei Wang, San Diego, CA (US); Ning Bi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 400 days.

(21) Appl. No.: 17/668,956

(22) Filed: Feb. 10, 2022

(65) Prior Publication Data

US 2023/0252687 A1     Aug. 10, 2023

(51) Int. Cl.
G06T 11/00     (2006.01)
G06N 3/08      (2023.01)
G06V 10/40     (2022.01)

(52) U.S. Cl.
CPC .............. *G06T 11/00* (2013.01); *G06N 3/08* (2013.01); *G06V 10/40* (2022.01)

(58) Field of Classification Search
CPC .......... G06T 11/00; G06N 3/08; G06V 10/40
See application file for complete search history.

(56) References Cited

U.S. PATENT DOCUMENTS

| | | | |
|---|---|---|---|
| 11,335,069 B1* | 5/2022 | Savchenkov | G06T 11/001 |
| 11,688,105 B2* | 6/2023 | Guo | G06T 7/248 |
| | | | 382/118 |
| 11,769,346 B2* | 9/2023 | Moustafa | G06V 10/82 |
| | | | 382/158 |
| 11,836,905 B2* | 12/2023 | Moustafa | G06T 5/50 |
| 11,854,579 B2* | 12/2023 | Moustafa | G06T 9/002 |
| 2016/0011769 A1* | 1/2016 | Zou | G06T 11/60 |
| | | | 715/863 |

(Continued)

FOREIGN PATENT DOCUMENTS

JP      6730461 B2 *   7/2020   ......... G06K 9/00302

OTHER PUBLICATIONS

Lingzhi Li, FaceShifter, Sep. 15, 2020, lingzhili.com, 1-11 (Year: 2020).*
International Search Report and Written Opinion—PCT/US2022/080514—ISA/EPO—Mar. 22, 2023.

(Continued)

*Primary Examiner* — Ted W Barnes
(74) *Attorney, Agent, or Firm* — Polsinelli/Qualcomm

(57) ABSTRACT

Systems and techniques are described for image processing. An imaging system receives an identity image and an attribute image. The identity image depicts a first person having an identity. The attribute image depicts a second person having an attribute, such as a facial feature, an accessory worn by the second person, and/or an expression. The imaging system uses trained machine learning model(s) to generate a combined image based on the identity image and the attribute image. The combined image depicts a virtual person having both the identity of the first person and the attribute of the second person. The imaging system outputs the combined image, for instance by displaying the combined image or sending the combined image to a receiving device. In some examples, the imaging system updates the trained machine learning model(s) based on the combined image.

30 Claims, 13 Drawing Sheets

(56) References Cited

U.S. PATENT DOCUMENTS

| | | | | |
|---|---|---|---|---|
| 2016/0335789 | A1* | 11/2016 | Zhang | G06F 3/0488 |
| 2018/0012386 | A1* | 1/2018 | Kemelmaher | G06F 16/58 |
| 2020/0027244 | A1* | 1/2020 | Ueda | G06T 7/90 |
| 2020/0334867 | A1* | 10/2020 | Chen | G06T 11/00 |
| 2021/0019541 | A1* | 1/2021 | Wang | G06V 40/172 |
| 2022/0084163 | A1* | 3/2022 | Lu | G06T 3/18 |
| 2022/0207785 | A1* | 6/2022 | Moore | G06T 7/174 |
| 2022/0374649 | A1* | 11/2022 | Naruniec | G06T 17/20 |
| 2022/0398795 | A1* | 12/2022 | Phan | G06N 3/0475 |
| 2023/0316591 | A1* | 10/2023 | Shu | G06V 10/7747 |
| | | | | 382/156 |

OTHER PUBLICATIONS

Li L., et al., "FaceShifter: Towards High Fidelity and Occlusion Aware Face Swapping", arxiv.org, Cornell university library, 201 Olin Library Cornell University Ithaca, NY 14853, Dec. 31, 2019, 11 Pages, XP081568500, Sections 3, 4, 4.1, Figures 1, 3 (a), Equations 3-4, 6-9.

Masood M., et al., "Deepfakes Generation and Detection: State-of-the-art, Open Challenges, Countermeasures, and Way Forward", arxiv.org, Cornell University Library, 201 Olin Library Cornell University Ithaca, NY 14853, Feb. 25, 2021, 42 Pages, XP081893425, Section 4.4.

Wang K., et al., "Multiple Exemplars-Based Hallucination for Face Super-Resolution and Editing", 16th European Conference—Computer Vision—ECCV 2020, Nov. 30, 2020, pp. 258-273, 2021, XP047577990, Sections 2-4, 3.1, p. 13, Last Paragraph, Figures 2, 6, 10, p. 5, Penultimate Paragraph, Equations 1-6.

\* cited by examiner

SYSTEMS AND METHODS FOR FACIAL ATTRIBUTE MANIPULATION

FIELD

This application is related to image processing. More specifically, this application relates to systems and methods of using input images depicting different people to generate a combined image of a virtual person with the identity of a first person depicted in a first input image, one or more attributes of a second person depicted in a second input image, and so forth.

BACKGROUND

A camera is a device that receives light and captures image frames, such as still images or video frames, using an image sensor. Image sensors of cameras can be used to capture images of a person in a scene, for instance where the person is in the field of view of the camera. A camera is generally configured to depict the photographed scene, including the person, accurately in the resulting captured image. Capture of images of people can be useful for a variety of applications, such as portraits, videoconferencing, extended reality (XR), video gaming, and the like.

BRIEF SUMMARY

In some examples, systems and techniques are described for image processing. An imaging system receives an identity image and an attribute image. The identity image depicts a first person having an identity. The attribute image depicts a second person having an attribute, such as a facial feature, an accessory worn by the second person, and/or an expression. The imaging system uses trained machine learning model(s) to generate a combined image based on the identity image and the attribute image. The combined image depicts a virtual person having both the identity of the first person and the attribute of the second person. The imaging system outputs the combined image, for instance by displaying the combined image or sending the combined image to a receiving device. In some examples, the imaging system updates the trained machine learning model(s) based on the combined image.

In one example, an apparatus for image processing is provided. The apparatus includes a memory and one or more processors (e.g., implemented in circuitry) coupled to the memory. The one or more processors are configured to and can: receive an identity image depicting a first person having an identity; receive an attribute image depicting a second person having an attribute; use one or more trained machine learning (ML) models to generate a combined image based on the identity image and the attribute image, wherein the combined image depicts a virtual person having the identity and the attribute; and output the combined image.

In another example, a method of image processing is provided. The method includes: receiving an identity image depicting a first person having an identity; receiving an attribute image depicting a second person having an attribute; using one or more trained machine learning (ML) models to generate a combined image based on the identity image and the attribute image, wherein the combined image depicts a virtual person having the identity and the attribute; and outputting the combined image.

In another example, a non-transitory computer-readable medium is provided that has stored thereon instructions that, when executed by one or more processors, cause the one or more processors to: receive an identity image depicting a first person having an identity; receive an attribute image depicting a second person having an attribute; use one or more trained machine learning (ML) models to generate a combined image based on the identity image and the attribute image, wherein the combined image depicts a virtual person having the identity and the attribute; and output the combined image.

In another example, an apparatus for image processing is provided. The apparatus includes: means for receiving an identity image depicting a first person having an identity; means for receiving an attribute image depicting a second person having an attribute; means for using one or more trained machine learning (ML) models to generate a combined image based on the identity image and the attribute image, wherein the combined image depicts a virtual person having the identity and the attribute; and means for outputting the combined image.

In some aspects, the first person is distinct from the second person.

In some aspects, one or more of the methods, apparatuses, and computer-readable medium described above further comprise: receiving an expression image depicting a third person having an expression, wherein the combined image depicts the virtual person having the identity and the attribute and the expression. In some aspects, the third person is distinct from the first person and the second person.

In some aspects, one or more of the methods, apparatuses, and computer-readable medium described above further comprise: receiving a second attribute image depicting a third person having a second attribute, wherein the combined image depicts the virtual person having the identity and the attribute and the second attribute. In some aspects, the third person is distinct from the first person and the second person. In some aspects, the second attribute is distinct from the attribute.

In some aspects, the attribute is of an attribute category, wherein the virtual person in the combined image also includes the attribute of the attribute category, wherein the attribute category includes at least one of a facial feature, a characteristic of a facial feature, a worn accessory, a hairstyle, an age, a head pose, a body pose, a facial expression, a gender, or a sex. In some aspects, the attribute includes a facial feature of a face of the second person as depicted in the attribute image, wherein a face of the virtual person in the combined image also includes the facial feature. In some aspects, the attribute includes a characteristic of a facial feature of a face of the second person as depicted in the attribute image, wherein a face of the virtual person in the combined image also includes the facial feature with the characteristic. In some aspects, the attribute includes an accessory worn by the second person as depicted in the attribute image, wherein the virtual person in the combined image also wears the accessory. In some aspects, the attribute includes a style of hair of the second person as depicted in the attribute image, wherein hair of the virtual person in the combined image also has the style. In some aspects, the attribute includes an age of the second person as depicted in the attribute image, wherein the virtual person in the combined image also has the age. In some aspects, the attribute includes a pose of a head of the second person as depicted in the attribute image, wherein a head of the virtual person in the combined image also has the pose. In some aspects, the attribute includes an expression of a face the second person as depicted in the attribute image, wherein the face of the virtual person in the combined image also has the expression.

In some aspects, one or more of the methods, apparatuses, and computer-readable medium described above further comprise: extracting one or more identity features from the identity image using one or more identity encoders; and extracting one or more attribute features from the identity image using one or more attribute encoders, wherein generating the combined image includes using the one or more identity features and the one or more attribute features as inputs to the one or more trained machine learning (ML) models.

In some aspects, generating the combined image includes using one or more multi-channel adaptive attentional denormalization (MC-AAD) layers to adjust one or more regions of a face based on at least one of based on one or more features from at least one of the identity image or the attribute image, wherein the one or more MC-AAD layers include the one or more trained machine learning (ML) models.

In some aspects, generating the combined image includes modifying the identity image to incorporate the attribute from the attribute image. In some aspects, generating the combined image includes modifying the attribute image to incorporate the identity from the identity image.

In some aspects, generating the combined image includes denormalizing the identity and the attribute using the one or more trained ML models. In some aspects, generating the combined image includes denormalizing and renormalizing the identity and the attribute using the one or more trained ML models.

In some aspects, generating the combined image includes minimizing classification of the combined image as synthesized by a discriminator that is configured to determine whether an input to the discriminator is synthesized or depicts a real person.

In some aspects, the one or more trained machine learning (ML) models are trained using a cycle-consistency process in which the one or more trained machine learning (ML) models reconstruct one or more source images from one or more previously-combined images previously generated using the one or more trained machine learning (ML) models.

In some aspects, one or more of the methods, apparatuses, and computer-readable medium described above further comprise: training a second set of one or more ML models based on the combined image, wherein the second set of one or more ML models is associated with a discriminator, wherein training the second set of one or more ML models trains the discriminator to classify the combined image as synthesized. In some aspects, one or more of the methods, apparatuses, and computer-readable medium described above further comprise: training the one or more ML models to generate the combined image so that the discriminator classifies the combined image as depicting a real person.

In some aspects, one or more of the methods, apparatuses, and computer-readable medium described above further comprise: using the one or more trained ML models to generate at least one of a reconstructed identity image or a reconstructed attribute image based on the combined image, wherein the reconstructed identity image is a reconstruction of the identity image based on the combined image, wherein the reconstructed attribute image is a reconstruction of the attribute image based on the combined image. In some aspects, one or more of the methods, apparatuses, and computer-readable medium described above further comprise: updating the one or more trained ML models based on a first comparison between the identity image and the reconstructed identity image and based on a second comparison between the attribute image and the reconstructed attribute image.

In some aspects, generating the combined image includes generating a combined video, wherein the combined image is a video frame of the combined video.

In some aspects, outputting the combined image sending the combined image to a recipient device. In some aspects, outputting the combined image causing the combined image to be displayed using a display.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures.

DETAILED DESCRIPTION

Figure 1:
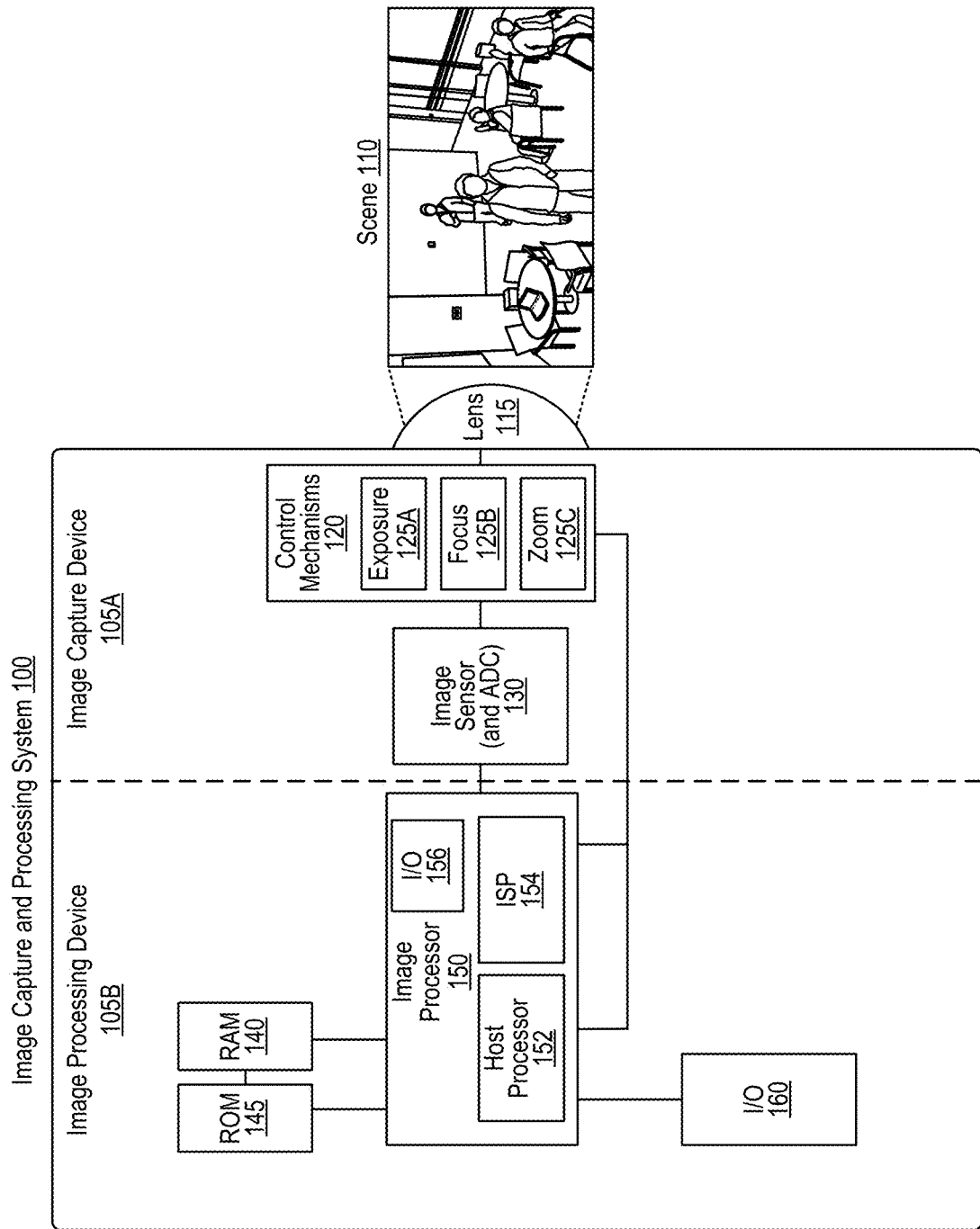
FIG. 1 is a block diagram illustrating an example architecture of an image capture and processing system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A camera is a device that receives light and captures image frames, such as still images or video frames, using an image sensor. Image sensors of cameras can be used to capture images of a person in a scene, for instance where the person is in the field of view of the camera. A camera is generally configured to depict the photographed scene, including the person, accurately in the resulting captured image. Capture of images of people can be useful for a variety of applications, such as portraits, videoconferencing, extended reality (XR), video gaming, or combinations thereof.

Extended reality (XR) systems or devices can provide virtual content to a user and/or can combine real-world views of physical environments (scenes) and virtual environments (including virtual content). XR systems facilitate user interactions with such combined XR environments. The real-world view can include real-world objects (also referred to as physical objects), such as people, vehicles, buildings, tables, chairs, and/or other real-world or physical objects. XR systems or devices can facilitate interaction with different types of XR environments (e.g., a user can use an XR system or device to interact with an XR environment). XR systems can include virtual reality (VR) systems facilitating interactions with VR environments, augmented reality (AR) systems facilitating interactions with AR environments, mixed reality (MR) systems facilitating interactions with MR environments, and/or other XR systems. Examples of XR systems or devices include head-mounted displays (HMDs), smart glasses, among others. In some cases, an XR system can track parts of the user (e.g., a hand and/or fingertips of a user) to allow the user to interact with items of virtual content.

Systems and techniques are described herein for image processing. An imaging system receives an identity image and one or more attribute images. The identity image depicts a first person having an identity. Each attribute image each depicts a person other than the first person (e.g., second person, third person, etc.) having an attribute, such as a facial feature, an accessory worn by the second person, and/or an expression. The imaging system uses trained machine learning model(s) to generate a combined image based on the identity image and the attribute image(s). The combined image depicts a virtual person having both the identity of the first person and the attribute of the second person. The imaging system outputs the combined image, for instance by displaying the combined image or sending the combined image to a receiving device. In some examples, the imaging system updates the trained machine learning model(s) based on the combined image.

The image processing systems and methods described herein provide various technical improvements over more traditional image processing systems. For instance, the image processing systems and methods described herein allow for numerous combined images of numerous virtual people to be generated from any number of source images of any number of different people, even with small numbers of source images and/or people. The image processing systems and methods described herein can employ an identity encoder to extract identity features to be modified, an expression encoder to extract expression features to be modified, and/or attribute encoders to extract other attributes (e.g., hair style, age, gender, gaze direction, and/or lighting direction). The image processing systems and methods described herein can employ one or more multi-channel adaptive attentional denormalization (MC-AAD) layers to adaptively adjust the effective regions of attributes from source to target images so that these attributes can participate in synthesizing different parts of the face. The image processing systems and methods described herein can apply cycle-consistency in model training to enhance the adjustment of attributes and make synthesized images more realistic.

Thus, the image processing systems and methods described herein can generate a high diversity of virtual faces, for instance having differences in identity as well as various attributes, such as eye color, eye shape, eyebrow shape, eyebrow thickness, eyebrow size, nose shape, nose thickness, nostril size, ear size, ear shape, head pose, hair style, skin tone, identity, expression, accessories (e.g., glasses, jewelry), hats, mouth shape, mouth size, teeth, lip shape, lip size, forehead size, forehead shape, baldness, head shape, head size, face shape, face size, age, gender, sex, gaze direction, lighting direction, illumination level, illumination type, other attributes described herein, or combinations thereof. The image processing systems and methods described herein generate realistic and high fidelity combined images depicting the virtual people, since identities, attributes, and/or expressions are based on source images, which can depict real people. The image processing systems and methods described herein can improve realism and/or fidelity of the combined images depicting the virtual people compared to systems and/or methods that generate virtual people with attributes that lack any basis on any source images. The image processing systems and methods described herein can improve efficiency and speed of generating the combined images depicting the virtual people compared to systems or methods that generate virtual people with attributes that lack any basis on any source images.

The image processing systems and methods described herein can be used for a variety of applications. In some examples, the high diversity of virtual people that can be generated using the image processing systems and methods described herein can be leveraged to provide a high-diversity set of face images, without privacy concerns, for training a machine learning (ML) system that processes, classifies, searches through, tracks objects within, extracts features from, or otherwise interacts with one or more images. Such ML systems can include one or more neural network (NNs), one or more convolutional neural networks (CNNs), one or more trained time delay neural networks (TDNNs), one or more deep networks, one or more autoencoders, one or more deep belief nets (DBNs), one or more recurrent neural networks (RNNs), one or more generative adversarial networks (GANs), one or more other types of neural networks, one or more trained support vector machines (SVMs), one or more trained random forests (RFs), one or more computer vision systems, one or more deep learning systems, or combinations thereof. The image processing systems and methods described herein can be customized to retain one or more attributes desired for faces in the set, such as any of the types of attributes described herein. The image processing systems and methods described herein can be used to improve privacy for people depicted in an image, for instance to mask the identity of a person who does not wish to appear in the image by removing the identity of the person and/or replacing the identity of the person with the identity of another person, for instance by removing facial features corresponding to the identity of the person from the depiction of the person in the image and/or replacing the facial features with different facial features corresponding to a different identity of a different person in the depiction of the person in the image.

The image processing systems and methods described herein can be used to perform image processing to correct issues related to facial expressions or attributes. For example, in group photos of large groups of people, the probability is high that at least one or two people in the group might have their eyes closed, or might not be smiling, at the moment the image was captured. The image processing systems and methods described herein can be used to correct such issues by applying attribute data and/or expression data from one or more images of person(s) who have their eyes open and/or who are smiling, ultimately producing an output image in which everyone in the group shot has their eyes open and is smiling. Similarly, a person depicted in an image might forget to take off his/her glasses. The image processing systems and methods described herein can virtually remove the person's glasses by applying attribute data from one or more images of person(s) who are not wearing glasses, ultimately producing an output image in which the person is not wearing his/her glasses. The image processing systems and methods described herein can also be used to generate training data to train machine learning model(s) using, for instance by enhancing the size of a small training dataset of a small number of images to a large and diverse training dataset of a large number of images, for instance by replacing identities, attributes, expressions, or combinations thereof in the small training dataset to produce the large training dataset. The image processing systems and methods described herein can also be used for face hallucination in which facial identities, attributes, and/or expressions can be changed on-the-fly. In some cases, image processing systems and methods described herein can also be used for face hallucination as used for generating a super-resolution image of the person.

The image processing systems and methods described herein can also be used for video call synthesis to reduce network load and latency (and/or increase privacy), for example by having the user's expression and/or attribute features transferred via network and applied to a still image of the user at the server or at the client device. Network load and latency, and/or privacy, can further be improved by synthesizing expression and/or attribute features based on the user's audio and applying the synthesized features to a still image of the user at the server or at the client device. For instance, if the user is making an "ooo" sound as they speak, the synthesized expression and/or attribute features can correspond to an expression where the user's mouth is open with lips pursed in a circular fashion. On the other hand, if the user is making a "fff" sound as they speak, the synthesized expression and/or attribute features can correspond to an expression where the user's upper teeth are connecting with the user's lower lip.

Various aspects of the application will be described with respect to the figures. FIG. 1 is a block diagram illustrating an architecture of an image capture and processing system 100. The image capture and processing system 100 includes various components that are used to capture and process images of one or more scenes (e.g., an image of a scene 110). The image capture and processing system 100 can capture standalone images (or photographs) and/or can capture videos that include multiple images (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130. In some examples, the scene 110 is a scene in an environment. In some examples, the scene 110 is a scene of at least a portion of a user. For instance, the scene 110 can be a scene of at least a portion of the user's face.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 1210 discussed with respect to the computing system 1200. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The image processor 150 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 150 may store image frames and/or processed images in random access memory (RAM) 140 and/or 1220, read-only memory (ROM) 145 and/or 1225, a cache, a memory unit, another storage device, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 1235, any other input devices 1245, or some combination thereof. In some cases, a caption may be input into the image processing device 105B through a physical keyboard or keypad of the I/O devices 160, or through a virtual keyboard or keypad of a touchscreen of the I/O devices 160. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the image capture and processing system 100 may be a single device. In some cases, the image capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the image capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The image capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 100 can include one or more wireless transceivers for wireless communications, such as cellular network communications, 802.11 wi-fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the image capture and processing system 100 is shown to include certain components, one of ordinary skill will appreciate that the image capture and processing system 100 can include more components than those shown in FIG. 1. The components of the image capture and processing system 100 can include software, hardware, or one or more combinations of software and hardware. For example, in some implementations, the components of the image capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 100.

Figure 2A:
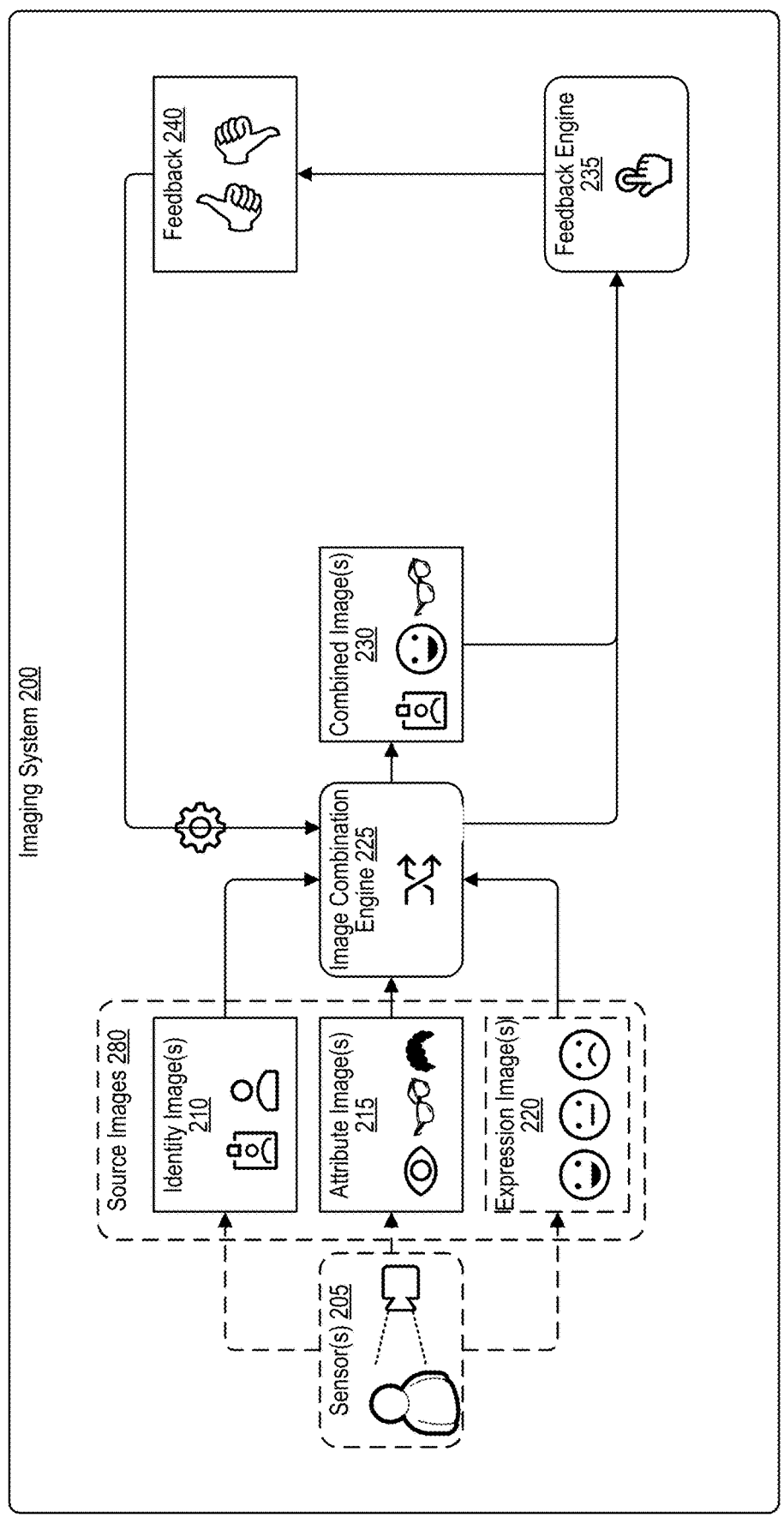
FIG. 2A is a block diagram illustrating an example architecture of an imaging system 200 that generates one or more combined images based on source images, in accordance with some examples.

FIG. 2A is a block diagram illustrating an example architecture of an imaging system 200 that generates one or more combined images 230 based on source images 280. In some examples, the imaging system 200 includes one or more sensors 205. In some examples, the sensor(s) 205 are not part of the imaging system 200, but the imaging system 200 is coupled to the sensor(s) 205, for instance using one or more connectors (e.g., wired connectors and/or wireless transceiver(s)) that coupled the sensor(s) 205 to the rest of the imaging system 200. Each of the sensor(s) 205 may be an example of the image capture and processing system 100, the image capture device 105A, the image processing device 105B, the image sensor 130, or a combination thereof.

The sensor(s) 205 capture at least one of the source images 280. In some examples, the imaging system 200 receives at least one of the source images 280 from the sensor(s) 205. In some examples, the imaging system captures at least one of the source images 280 using the sensor(s) 205. The source images 280 include at least one or more identity images 210 and one or more attribute images 215. In some examples, the source images 280 also include one or more expression images 220. The identity image(s) 210 depict a first person with an identity. The attribute image(s) 215 depict a second person with one or more attributes. In some examples, the attribute image(s) 215 depict multiple people with the attribute(s). In some examples, the attribute image(s) 215 depict multiple people with multiple different attributes. The expression image(s) 220 depict a third person with an expression. In some examples, the expression image(s) 220 depict multiple people with the expression. In some examples, the expression image(s) 220 depict multiple people with multiple different expressions.

The imaging system 200 includes an image combination engine 225. The imaging system 200 uses at least a subset of the source images 280 as inputs to the image combination engine 225. For instance, the imaging system 200 uses the identity image(s) 210, the attribute image(s) 215, and/or the expression image(s) 220 as inputs for the image combination engine 225. The image combination engine 225 can include an identity encoder (e.g., identity encoder 320). to detect and/or extract identity features from the identity image(s) 210. The image combination engine 225 can include an expression encoder (e.g., expression encoder 325) to detect and/or extract expression features from the expression image(s) 220. The image combination engine 225 can include an attribute encoder to detect and/or extract attribute features from the attribute image(s) 215. Attribute features can include, for example, hair style, age, gender, gaze direction, and/or lighting direction. One of more of these encoders may be referred to as a multi-level attribute encoder (e.g., multi-level attribute encoder 390).

Figure 7:
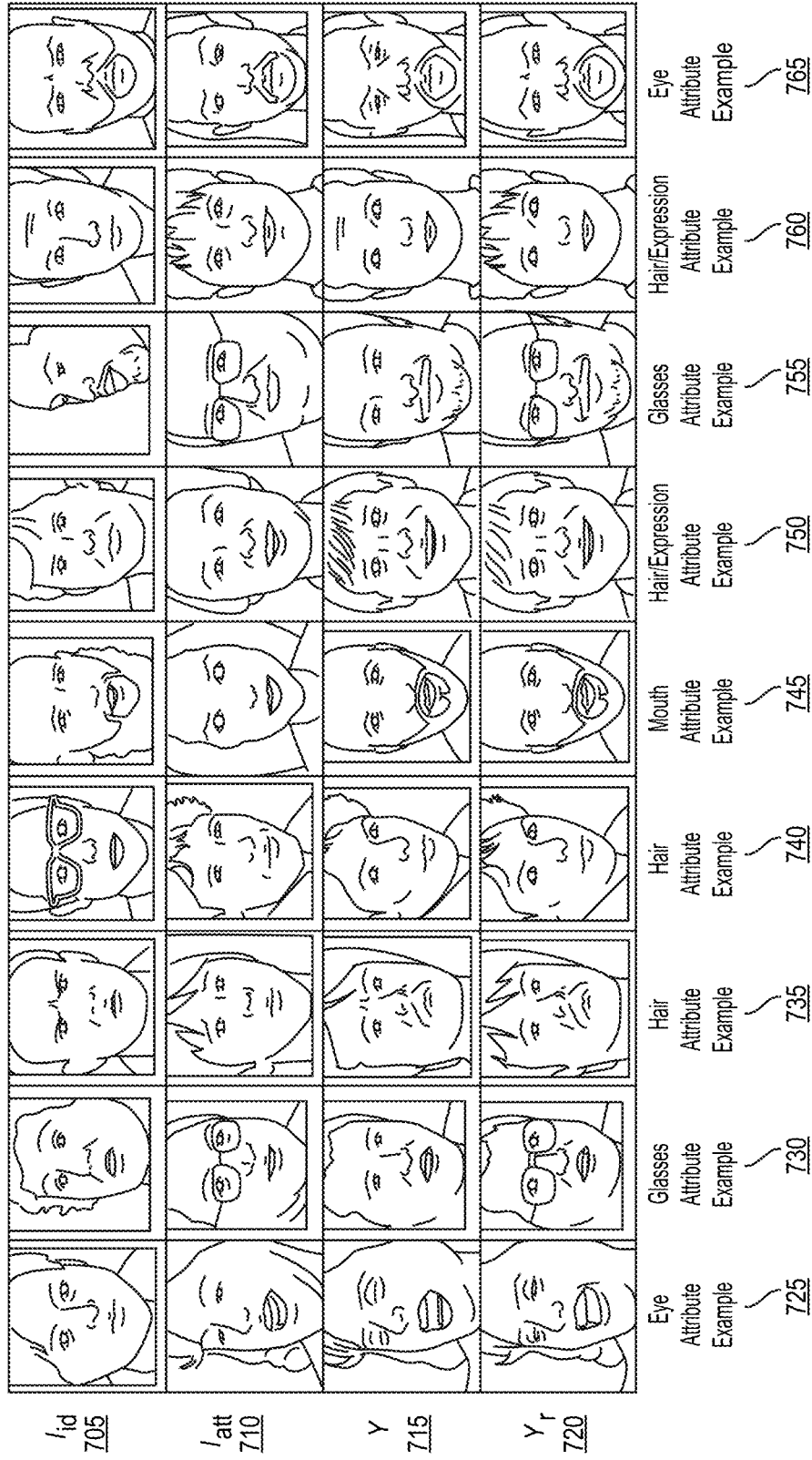
FIG. 7 is a table illustrating examples of use of an identity image $I_{id}$ and an attribute image $I_{att}$ to generate a combined image Y and a combined image based on cycle reconstruction training $Y_r$, in accordance with some examples.
Figure 8:
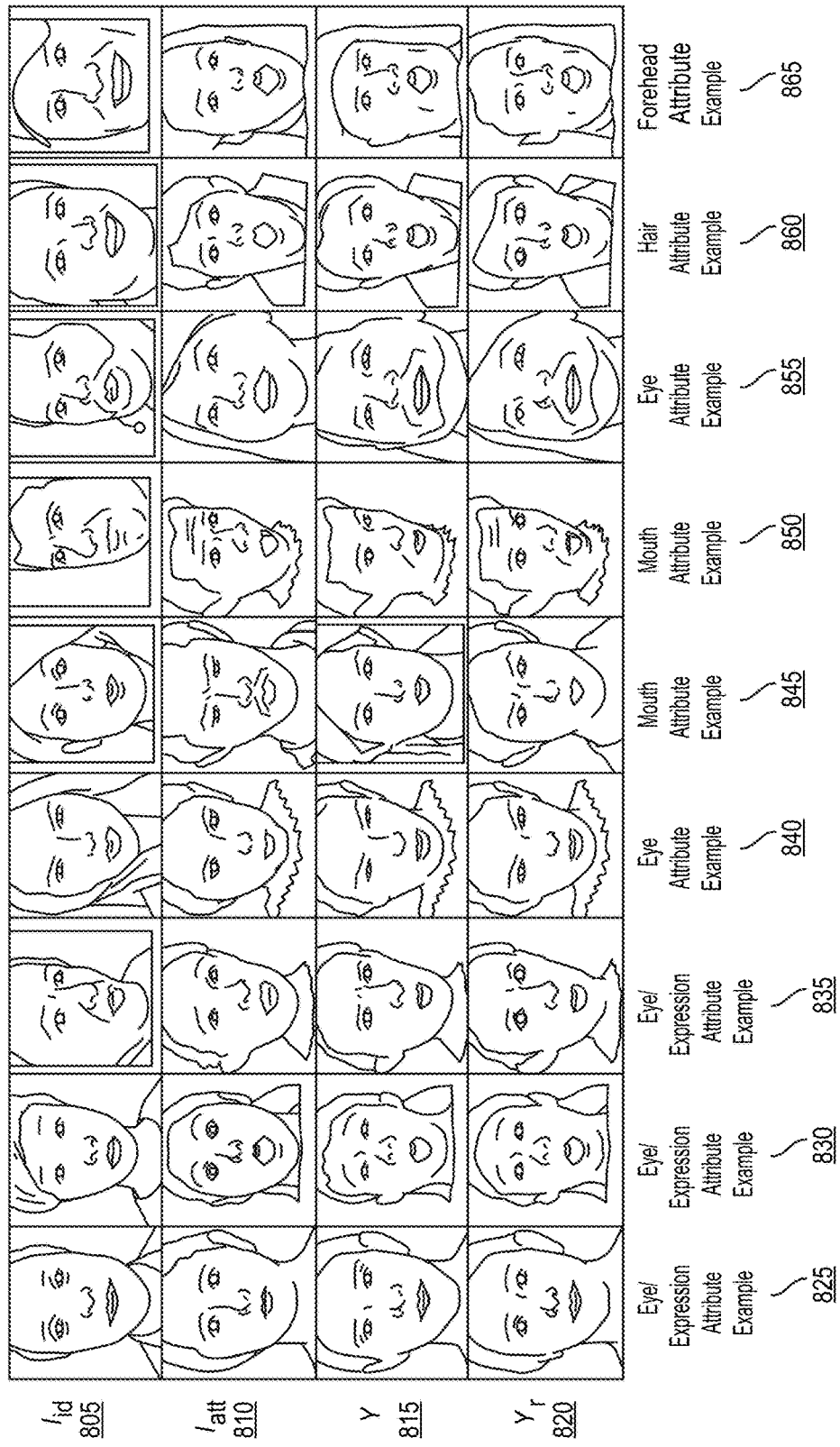
FIG. 8 is a table illustrating additional examples of use of an identity image $I_{id}$ and an attribute image $I_{att}$ to generate a combined image Y and a combined image based on cycle reconstruction training $Y_r$, in accordance with some examples.
Figure 9:
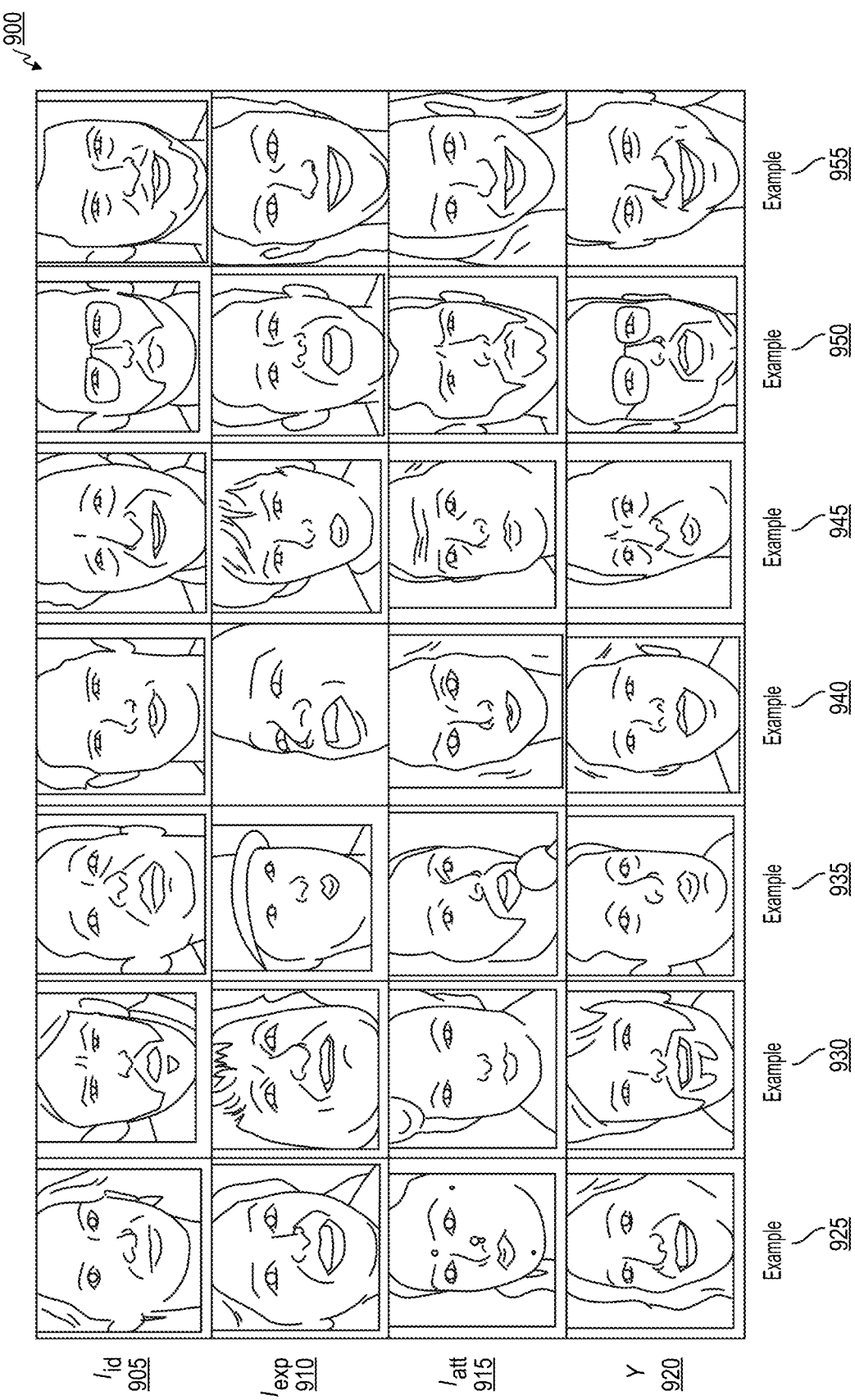
FIG. 9 is a table illustrating examples of use of an identity image $I_{id}$, an expression image $I_{exp}$, and an attribute image $I_{att}$ to generate a combined image Y, in accordance with some examples.

The image combination engine 225 receives these source image(s) 280 as input image data, and, in response, automatically generates one or more combined images 230. The combined image(s) 230 combine various characteristics of at least a subset of the source images 280. In an illustrative example, the combined image(s) 230 depict a virtual person with the identity of the first person who is depicted in the identity image(s) 210, with the attribute(s) of the second person who is depicted in the attribute image(s) 215, and the expression of the third person who is depicted in the expression image(s) 220. Examples of generation of such virtual persons are illustrated in FIG. 9. In a second illustrative example, the combined image(s) 230 depict a virtual person with the identity of the first person who is depicted in the identity image(s) 210 and with the attribute(s) of the second person who is depicted in the attribute image(s) 215. Examples of generation of such virtual persons are illustrated in FIGS. 7-9. In a third illustrative example, the combined image(s) 230 depict a virtual person with the identity of the first person who is depicted in the identity image(s) 210 and with the expression of the third person who is depicted in the expression image(s) 220. Examples of generation of such virtual persons are illustrated in FIG. 9. In a fourth illustrative example, the combined image(s) 230 depict a virtual person with the attribute(s) of the second person who is depicted in the attribute image(s) 215 and with the expression of the third person who is depicted in the expression image(s) 220. Examples of generation of such virtual persons are illustrated in FIG. 9.

Examples of the attribute(s) of the person or people depicted in the attribute image(s) 215, that are also the attribute(s) of the virtual person or virtual people depicted in the combined image(s) 230, can include eye color, eye shape, eyebrow shape, eyebrow thickness, eyebrow size, nose shape, nose thickness, nostril size, ear size, ear shape, head pose, hair style, skin tone, identity, expression, accessories (e.g., glasses, jewelry), hats, mouth shape, mouth size, teeth, lip shape, lip size, forehead size, forehead shape, baldness, head shape, head size, face shape, face size, age, gender, sex, gaze direction, lighting direction, illumination level, illumination type, other attributes described herein, or combinations thereof. In some examples, the image combination engine 225 uses the expression image(s) 220 as a basis to provide and/or generate the expression of the virtual person or virtual people in the combined image(s) 230. In some examples, the image combination engine 225 uses the attribute image(s) 215 as a basis to provide and/or generate the expression of the virtual person or virtual people in the combined image(s) 230. For instance, if no expression image(s) 220 are received and/or used, then the attribute image(s) 215 can be the main basis to provide and/or generate the expression of the virtual person or virtual people in the combined image(s) 230. In some examples, the image combination engine 225 uses a combination of the attribute image(s) 215 and the expression image(s) 220 as a basis to provide and/or generate the expression of the virtual person or virtual people in the combined image(s) 230. For instance, the mouth of a virtual person in the combined image(s) 230 can be smiling because a person in the expression image(s) 220 is smiling, and the smiling expression of the virtual person in the combined image(s) 230 can further be enhanced based on eye attributes softening the eyes of the virtual person based on the softer eyes of a person in the attribute image(s) 215.

In some examples, the image combination engine 225 includes one or more machine learning (ML) systems and/or one or more trained ML models. Examples of the image combination engine 225 include any type of ML system and/or trained ML model, such as one or more NNs, one or more CNNs, one or more TDNNs, one or more deep networks, one or more autoencoders, one or more DBNs, one or more RNNs, one or more GANs, one or more trained SVMs, one or more trained RFs, one or more computer vision systems, one or more deep learning systems, or combinations thereof. In some examples, the image combination engine 225 includes one or more multi-channel adaptive attentional denormalization (MC-AAD) layers to adaptively adjust the effective regions of attributes from the source image(s) 280 to the combined image(s) 230 so that these attributes can participate in synthesizing different parts of the face for the combined image(s) 230. In some examples, the image combination engine 225 apply cycle-consistency in model training (e.g., see FIGS. 6A-6B) to enhance the adjustment of attributes and make synthesized images more realistic.

Examples of the image combination engine 225, or components thereof, include the reconstruction engine 255, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the image synthesis engine 615, the neural network 1000, the one or more trained ML models of operation 1115, a ML model running on the computing system 1200, a portion (e.g., component, element, and/or subroutine) of any of the listed systems, or a combination thereof. An illustrative example of the image combination engine 225 is the image synthesis engine 300. A second illustrative example of the image combination engine 225 is the image synthesis engine 520. A third illustrative example of the image combination engine 225 is the image synthesis engine 615.

In some examples, the imaging system 200 includes a feedback engine 235 that receives and/or generates feedback 240. The feedback 240 can be based on the combined image(s) 230, the generation of the combined image(s) 230 by the image combination engine 225, a comparison between the combined image(s) 230 and at least a subset of the source images 280, or a combination thereof. In some examples, the feedback engine 235 receives the feedback 240 through a user interface from a user. In some examples, the feedback engine 235 automatically analyzes the combined image(s) 230 to provide the feedback 240. In some examples, the feedback engine 235 automatically analyzes the generation of the combined image(s) 230 by the image combination engine 225 to provide the feedback 240. In some examples, the feedback engine 235 automatically compares the combined image(s) 230 and at least a subset of the source images 280 to provide the feedback 240.

The feedback 240 received and/or generated by the feedback engine 235 can be input into the image combination engine 225 to further train the trained ML model(s) of the image combination engine 225. In some examples, the feedback engine 235 can include a discriminator, which may be a ML-based classifier that is trained to determine whether a person depicted in an image is a real person or a synthesized person (e.g., "fake"), such as the virtual person in the combined image(s) 230. The feedback 240 can include a classification, by the discriminator, of whether the discriminator has determined the virtual person in the combined image(s) 230 to be real or synthesized. The discriminator's classification can be used to further train the trained ML model(s) of the image combination engine 225 to maximize classification of the virtual person as real by the discriminator, and/or to minimize classification of the virtual person as synthesized by the discriminator.

In some examples, the feedback engine 235 can include a facial recognition classifier, which may be a ML-based classifier that is trained to determine an identity of a person depicted in an image based on comparisons to reference images of persons with known identities, or features extracted therefrom. The feedback 240 can include a classification, by the facial recognition classifier, of the identity of the virtual person in the combined image(s) 230. The facial recognition classifier's classification can be used to further train the trained ML model(s) of the image combination engine 225 to maximize classification of the virtual person as sharing the same identity as the first person depicted in the identity image(s) 210, and/or to minimize classification of the virtual person as having any other identity, and/or to minimize classification of the virtual person as having an unknown identity.

In some examples, the feedback engine 235 can include an attribute recognition classifier, which may be a ML-based classifier that is trained to determine an attribute of a person depicted in an image based on comparisons to reference images of persons with known attributes, or features extracted therefrom. The feedback 240 can include a classification, by the attribute recognition classifier, of one or more of the attributes of the virtual person in the combined image(s) 230. The expression recognition classifier's classification can be used to further train the trained ML model(s) of the image combination engine 225 to maximize classification of the virtual person as sharing at least a subset of the attribute(s) of the second person depicted in the attribute image(s) 215, and/or to minimize classification of the virtual person as having any other attribute, and/or to minimize classification of the virtual person as having an unknown attribute.

In some examples, the feedback engine 235 can include an expression recognition classifier, which may be a ML-based classifier that is trained to determine an expression of a person depicted in an image based on comparisons to reference images of persons with known expressions, or features extracted therefrom. The feedback 240 can include a classification, by the expression recognition classifier, of the expression of the virtual person in the combined image(s) 230. The expression recognition classifier's classification can be used to further train the trained ML model(s) of the image combination engine 225 to maximize classification of the virtual person as sharing the same expression as the third person depicted in the expression image(s) 220, and/or to minimize classification of the virtual person as having any other expression, and/or to minimize classification of the virtual person as having an unknown expression.

In some examples, the feedback engine 235 includes one or more ML systems and/or one or more trained ML models. Examples of the feedback engine 235 include any type of ML system and/or trained ML model, such as one or more NNs, one or more CNNs, one or more TDNNs, one or more deep networks, one or more autoencoders, one or more DBNs, one or more RNNs, one or more GANs, one or more trained SVMs, one or more trained RFs, one or more computer vision systems, one or more deep learning systems, or combinations thereof. In some examples, the feedback engine 235 includes the comparison engine 290, and/or the comparison engine 290 includes the feedback engine 235.

Figure 2B:
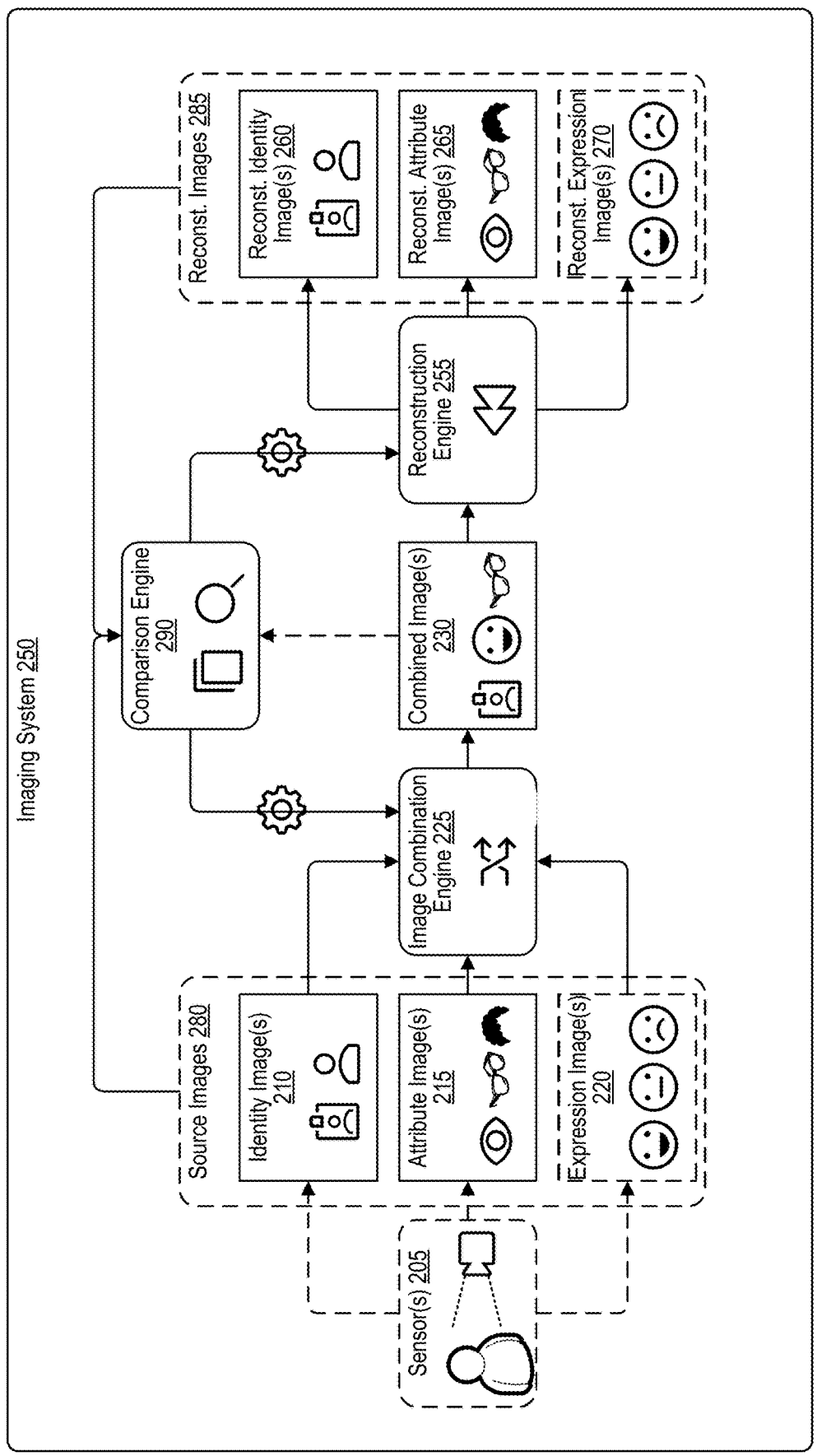
FIG. 2B is a block diagram illustrating an example architecture of an imaging system that generates one or more combined images based on source images, that generates reconstructed images based on the one or more combined images, and that learns based on comparisons between the source images and the reconstructed images, in accordance with some examples.

FIG. 2B is a block diagram illustrating an example architecture of an imaging system 250 that generates one or more combined images 230 based on source images 280, that generates reconstructed images 285 based on the one or more combined images 230, and that learns based on comparisons between the source images 280 and the reconstructed images 285. The imaging system 250 of FIG. 2B includes at least a subset of the components, elements, and/or subroutines of the imaging system 200 of FIG. 2A. For instance, like the imaging system 200 of FIG. 2A, the imaging system 250 of FIG. 2B includes an image combination engine 225 that generates the one or more combined images 230 based on at least a subset of the source images 280 from the sensor(s) 205, including the identity image(s) 210, the attribute image(s) 215, and/or the expression image(s) 220.

The imaging system 250 also includes a reconstruction engine 255. The reconstruction engine 255 receives the combined image(s) 230 as inputs to the reconstruction engine 255. The reconstruction engine 255, in response to receiving the combined image(s) 230 as inputs, generates reconstructed images 285, including the reconstructed identity image(s) 260, the reconstructed attribute image(s) 265, and/or the reconstructed expression image(s) 270. The reconstructed images 285 are attempts by the reconstruction engine 255 to reconstruct the source images 280 using the combined image(s) 230. For instance, the reconstructed identity image(s) 260 are attempts by the reconstruction engine 255 to reconstruct the identity image(s) 210 using the combined image(s) 230, the reconstructed attribute image(s) 265 are attempts by the reconstruction engine 255 to reconstruct the attribute image(s) 215 using the combined image(s) 230, and the reconstructed expression image(s) 270 are attempts by the reconstruction engine 255 to reconstruct the expression image(s) 220 using the combined image(s) 230.

In some examples, the reconstruction engine 255 and the image combination engine 225 include a shared component, element, or subroutine. For instance, the reconstruction engine 255 and the image combination engine 225 can both share one or more trained ML models. In some examples, the reconstruction engine 255 and the image combination engine 225 share an image synthesis engine 615. For instance, the two instances of the image synthesis engine 615 on the left-hand side of FIG. 6A (that generate combined image $Y_{ac}$ 620 and combined image $Y_{ca}$ 625, respectively) may represent examples of the image combination engine 225, while the two instances of the image synthesis engine 615 on the right-hand side of FIG. 6A (that generate reconstructed image $Y_{acca}$ 630 and reconstructed image $Y_{caac}$ 635, respectively) may represent examples of the reconstruction engine 255. An illustrative example of the reconstruction engine 255 is the image synthesis engine 300. A second illustrative example of the reconstruction engine 255 is the image synthesis engine 520. A third illustrative example of the reconstruction engine 255 is the image synthesis engine 615.

In some examples, the reconstruction engine 255 includes one or more machine learning (ML) systems and/or one or more trained ML models. Examples of the image combination engine 225 include any type of ML system and/or trained ML model, such as one or more NNs, one or more CNNs, one or more TDNNs, one or more deep networks, one or more autoencoders, one or more DBNs, one or more RNNs, one or more GANs, one or more trained SVMs, one or more trained RFs, one or more computer vision systems, one or more deep learning systems, or combinations thereof. Examples of the reconstruction engine 255 include the image combination engine 225, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the image synthesis engine 615, the neural network 1000, the one or more trained ML models of operation 1115, a ML model running on the computing system 1200, a portion (e.g., component, element, and/or subroutine) of any of the listed systems, or a combination thereof.

The imaging system 250 includes a comparison engine 290. The comparison engine 290 receives at least a subset of the source images 280 and at least a subset of the reconstructed images 285. In some examples, the comparison engine 290 also receives the combined image(s) 230. For instance, comparison engine 290 can receive the identity image(s) 210, the attribute image(s) 215, the expression image(s) 220, the reconstructed identity image(s) 260, the reconstructed attribute image(s) 265, the reconstructed expression image(s) 270, the combined image(s) 230, or a combination thereof. In response to receiving these images, the comparison engine 290 automatically compares at least a subset of the reconstructed images 285 to at least a subset of the source images 280 and/or to the combined image(s) 230. In an illustrative example, the comparison engine 290 compares the reconstructed identity image(s) 260 to the identity image(s) 210, and compares the reconstructed attribute image(s) 265 to the attribute image(s) 215. In a second illustrative example, the comparison engine 290 compares the reconstructed identity image(s) 260 to the identity image(s) 210, compares the reconstructed attribute image(s) 265 to the attribute image(s) 215, and compares the reconstructed expression image(s) 270 to the expression image(s) 220.

The comparison engine 290 can output, based on its comparison, a value identifying how close one image is to another. In an illustrative example, the comparison engine 290 can output, based on its comparison between the reconstructed identity image(s) 260 and the identity image(s) 210, a value identifying how close the reconstructed identity image(s) 260 and the identity image(s) 210 are to one another. In a second illustrative example, the comparison engine 290 can output, based on its comparison between the reconstructed attribute image(s) 265 and the attribute image(s) 215, a value identifying how close the reconstructed attribute image(s) 265 and the attribute image(s) 215 are to one another. In a third illustrative example, the comparison engine 290 can output, based on its comparison between the reconstructed expression image(s) 270 and the expression image(s) 220, a value identifying how close the reconstructed expression image(s) 270 and the expression image(s) 220 are to one another.

The comparison engine 290 can output, based on its comparison, specific differences found between one image and another. In an illustrative example, the comparison engine 290 can output, based on its comparison between the reconstructed identity image(s) 260 and the identity image(s) 210, a difference between the reconstructed identity image(s) 260 and the identity image(s) 210. In a second illustrative example, the comparison engine 290 can output, based on its comparison between the reconstructed attribute image(s) 265 and the attribute image(s) 215, a difference between the reconstructed attribute image(s) 265 and the attribute image(s) 215. In a third illustrative example, the comparison engine 290 can output, based on its comparison between the reconstructed expression image(s) 270 and the expression image(s) 220, a difference between the reconstructed expression image(s) 270 and the expression image(s) 220.

In some examples, the comparison engine 290 uses image differencing, keypoint matching (e.g., involving extracting and comparing keypoints from both compared images), histogram comparison (e.g., involving generating and comparing histograms from both compared images), means squared error, cosine similarity, or combinations thereof. In some examples, the comparison engine 290 includes one or more ML systems and/or one or more trained ML models. Examples of the comparison engine 290 include any type of ML system and/or trained ML model, such as one or more NNs, one or more CNNs, one or more TDNNs, one or more deep networks, one or more autoencoders, one or more DBNs, one or more RNNs, one or more GANs, one or more trained SVMs, one or more trained RFs, one or more computer vision systems, one or more deep learning systems, or combinations thereof. In some examples, the comparison engine 290 includes the feedback engine 235, and/or the feedback engine 235 includes the comparison engine 290.

The comparison information output by the comparison engine 290—for instance, the values identifying similarity and/or the identified differences—can be input into the image combination engine 225 to further train the trained ML model(s) of the image combination engine 225. Similarly, the comparison information output by the comparison engine 290 can be input into the reconstruction engine 255 to further train the trained ML model(s) of the reconstruction engine 255.

In some examples, the comparison information can be used to further train the trained ML model(s) of the image combination engine 225 and/or the reconstruction engine 255 to maximize similarity between, and/or to minimize differences between, the reconstructed identity image(s) 260 and the identity image(s) 210. In some examples, the comparison information can be used to further train the trained ML model(s) of the image combination engine 225 and/or the reconstruction engine 255 to maximize similarity between, and/or to minimize differences between, the reconstructed attribute image(s) 265 and the attribute image(s) 215. In some examples, the comparison information can be used to further train the trained ML model(s) of the image combination engine 225 and/or the reconstruction engine 255 to maximize similarity between, and/or to minimize differences between, the reconstructed expression image(s) 270 and the expression image(s) 220.

Figure 3:
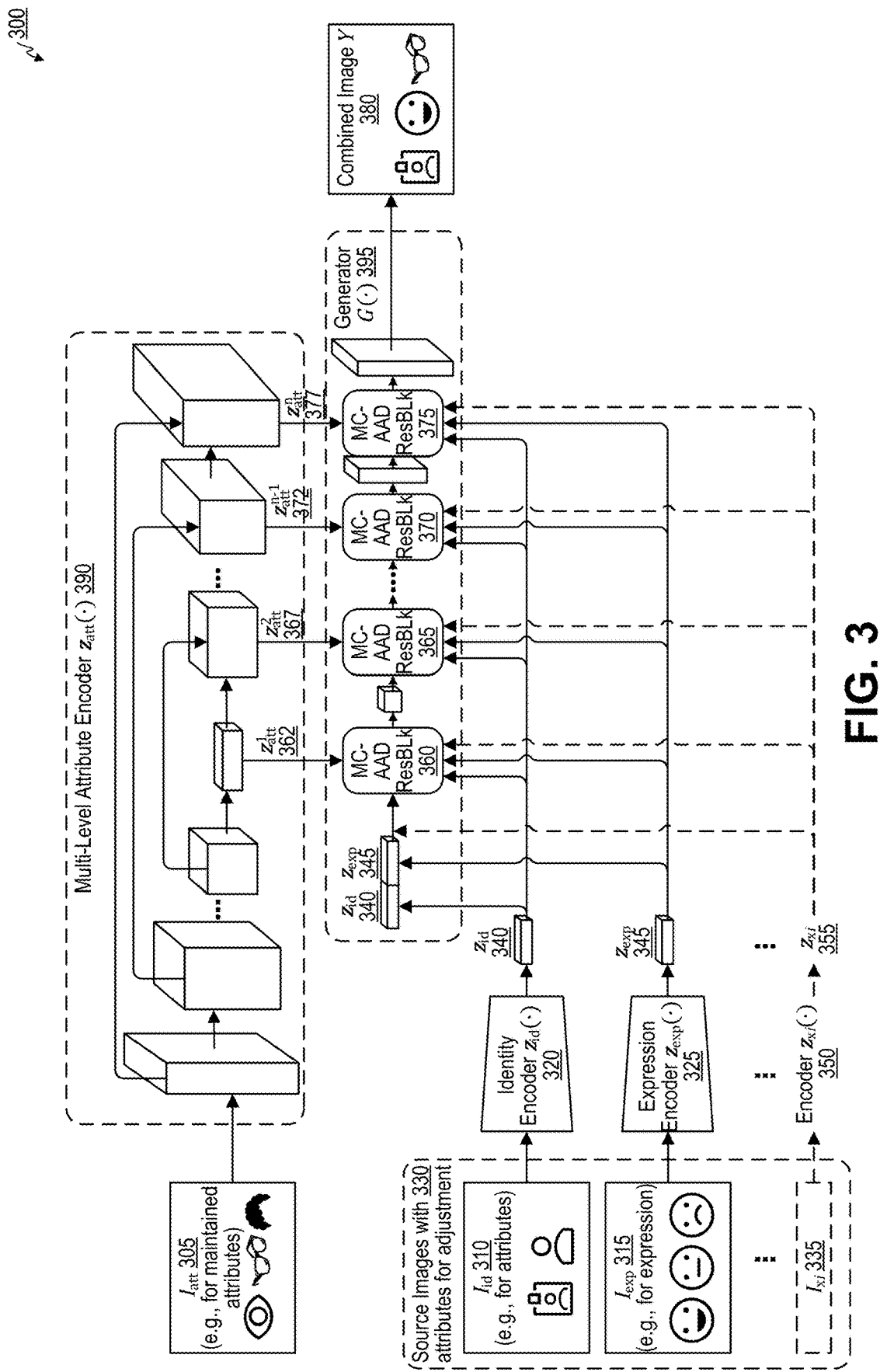
FIG. 3 is a block diagram illustrating an example architecture of an image synthesis engine that generates a combined image Y based on an attribute image $I_{att}$, an identity image $I_{id}$, an expression image $I_{exp}$, and/or one or more other images $I_{x_i}$, in accordance with some examples.

FIG. 3 is a block diagram illustrating an example architecture of an image synthesis engine 300 that generates a combined image Y 380 based on an attribute image $I_{att}$ 305, an identity image $I_{id}$ 310, an expression image $I_{exp}$ 315, and/or one or more images $I_{x_i}$ 335. In the image synthesis engine 300 illustrated in FIG. 3, the attribute image $I_{att}$ 305 is used as a base image to be modified based on identity features $z_{id}(I_{id})$ 340 from the identity image $I_{id}$ 310, expression features $z_{exp}(I_{exp})$ 345 from the expression image $I_{exp}$ 315, and/or features $z_{x_i}(I_{x_i})$ 355 from the images $I_{x_i}$ 335.

The attribute image $I_{att}$ 305 is input into a multi-scale attribute encoder $z_{att}(\cdot)$ 390. The multi-scale attribute encoder $z_{att}(\cdot)$ 390 extracts multi-scale features from the attribute image $I_{att}$ 305 as $z_{att}(I_{att}) = \{z_{att}^k(I_{att}) | k=1 \ldots n\}$, where n presents different feature levels. In some examples, the attributes encoded by the multi-scale attribute encoder $z_{att}(\cdot)$ 390 are maintained in the combined image Y 380. Examples of the multi-scale features $z_{att}^k(I_{att})$ include feature(s) $z_{att_1}(I_{att})$ 362, $z_{att}^2(I_{att})$ 367, $z_{att}^{n-1}(I_{att})$ 372, and $z_{att}^n(I_{att})$ 377.

The image synthesis engine 300 includes an identity encoder $z_{id}(\cdot)$ 320, which is used to extract identity features $z_{id}(I_{id})$ 340 from the identity image $I_{id}$ 310. The image synthesis engine 300 includes an expression encoder $z_{exp}(\cdot)$ 325, which is used to extract expression features $Z_{exp}(I_{exp})$ 345 from the expression image $I_{exp}$ 315. For each image $I_{x_i}$ 335, the image synthesis engine 300 includes an encoder $z_{x_i}(\cdot)$ 350, which is used to extract features $z_{x_i}(I_{x_i})$ 355 from the image $I_{x_i}$ 335.

A set of pre-trained feature encoders $\{z_{x_i}(\cdot)\}$ corresponds to a set of facial attributes x to be adjusted to generate the combined image Y 380. Each attribute $x_i \in x$ is assigned with an input image $I_{x_i}$ and an encoder $z_{x_i}(\cdot)$. The image synthesis engine 300 sends the extracted features $z_{x_i}(I_{x_i})$ are sent to a generator $G(\cdot)$ 395 to guide generation of the combined image Y 380 using the generator $G(\cdot)$ 395.

In the context illustrated in FIG. 3, the image synthesis engine 300 is configured to, and can, change the identity id and expression exp of the attribute image $I_{att}$ 305 to generate the combined image Y 380. Thus, in FIG. 3, x={id, exp}. For instance, $x_i = x_1 = x_{id}$ where i=1, and $x_i = x_2 = x_{exp}$ where i=2, and so forth. Identity and expression are the two examples of attributes to be adjusted. The image synthesis engine 300 can include additional pretrained feature encoders, illustrated in FIG. 3 as the encoder $z_{x_i}(\cdot)$ 350, which extract features $z_{x_i}(I_{x_i})$ 355 from the image $I_{x_i}$ 335. These features $z_{x_i}(I_{x_i})$ 355 can represent other attributes than the attributes in the attribute image $I_{att}$ 305.

The generator $G(\cdot)$ 395 receives, as inputs, the multi-scale features $z_{att}^k(I_{att})$ extracted from the attribute image $I_{att}$ 305 using the multi-scale attribute encoder $z_{att}(\cdot)$ 390, the identity features $z_{id}(I_{id})$ 340 extracted from the identity image $I_{id}$ 310 using the identity encoder $z_{id}(\cdot)$ 320, the expression features $z_{exp}(I_{exp})$ 345 extracted from the expression image $I_{exp}$ 315 using the expression encoder $z_{exp}(\cdot)$ 325, and/or the features $z_{x_i}(I_{x_i})$ 355 extracted from the images $I_{x_i}$ 335 using the encoder $z_{x_i}(\cdot)$ 350. The multi-scale features $z_{att}^k(I_{att})$ represent attributes that are to be maintained in the combined image Y 380.

Figure 4:
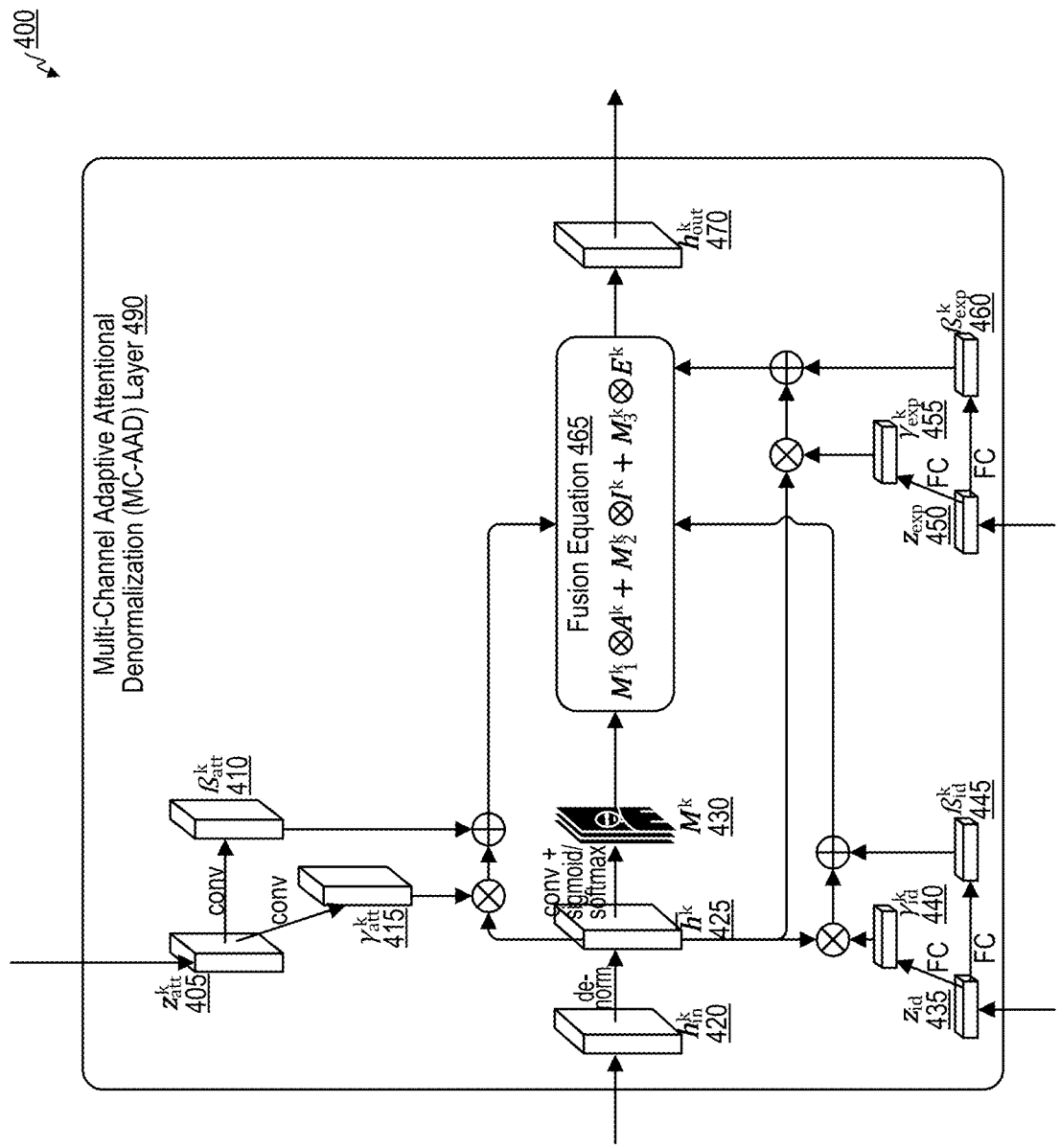
FIG. 4 is a block diagram illustrating an example architecture of a multi-channel adaptive attentional denormalization (MC-AAD) layer system, in accordance with some examples.

The generator GO 395 includes n multi-channel adaptive attentional denormalization (MC-AAD) residual blocks, including MC-AAD residual block 360, MC-AAD residual block 365, MC-AAD residual block 370, and MC-AAD residual block 375. In FIG. 3, n is also the number of levels or scales in the multi-scale attribute encoder $z_{att}(\cdot)$ 390. Each MC-AAD residual block includes one or more MC-AAD layers (e.g., one MC-AAD layer, two MC-AAD layers, or more than two MC-AAD layers). In some examples, each MC-AAD residual block includes a bypass branch. The MC-AAD layer 490 of FIG. 4 is an example of each of the MC-AAD layers of the MC-AAD residual blocks of FIG. 3. Each MC-AAD layer combines and/or embeds the maintained attributes $z_{att}(I_{att})$ and adjusted attributes $z_{x_i}(I_{x_i})$, at a specific scale. The attributes $z_{att}(I_{att})$ and adjusted attributes $z_{x_i}(I_{x_i})$ can be implemented at multiple scales by different respective MC-AAD residual blocks. For instance, a $k^{th}$ MC-AAD residual block receives as inputs, and fuses together, the features $z_{att}^k(I_{att})$, upsampled activations from a k−$1^{th}$ MC-AAD residual block, the identity features $z_{id}(I_{id})$ 340, the expression features $z_{exp}(I_{exp})$ 345, and/or the features $z_{x_i}(I_{x_i})$ 355.

In an illustrative example, the first MC-AAD residual block 360 receives as inputs, and fuses together, the features $z_{att}^1(I_{att})$ 362, the identity features $z_{id}(I_{id})$ 340, the expression features $z_{exp}(I_{exp})$ 345, and/or the features $z_{x_i}(I_{x_i})$ 355. The second MC-AAD residual block 365 receives as inputs, and fuses together, the features $z_{att}^2(I_{att})$ 367, upsampled activations from the first MC-AAD residual block 360, the identity features $z_{id}(I_{id})$ 340, the expression features $z_{exp}(I_{exp})$ 345, and/or the features $z_{x_i}(I_{x_i})$ 355. The n−$1^{th}$ MC-AAD residual block 370 receives as inputs, and fuses together, the features $z_{att}^{n-1}(I_{att})$ 372, upsampled activations from the n−$2^{th}$ MC-AAD residual block, the identity features $z_{id}(I_{id})$ 340, the expression features $z_{exp}(I_{exp})$ 345, and/or the features $z_{x_i}(I_{x_i})$ 355. The $n^{th}$ MC-AAD residual block 375 receives as inputs, and fuses together, the features $z_{att}^n(I_{att})$ 377, upsampled activations from the n−$1^{th}$ MC-AAD residual block 370, the identity features $z_{id}(I_{id})$ 340, the expression features $z_{exp}(I_{exp})$ 345, and/or the features $z_{x_i}(I_{x_i})$ 355. This fusion by the $n^{th}$ MC-AAD residual block 375 produces the combined image Y 380.

In an illustrative example, the attribute image $I_{att}$ 305 includes one or more maintained attributes, such as backgrounds, head pose, and illumination. The generator GO 395 fuses the identity features $z_{id}(I_{id})$ 340 from the identity image $I_{id}$ 310 with the attribute image $I_{att}$ 305 at multiple scales to change the identity of the virtual person depicted in the combined image Y 380 to match the identity of the person depicted in the identity image $I_{id}$ 310. The generator GO 395 fuses the expression features $z_{exp}(I_{exp})$ 345 from the expression image $I_{exp}$ 315 with the attribute image $I_{att}$ 305 at multiple scales to change the expression of the virtual person depicted in the combined image Y 380 to match the expression of the person depicted in the expression image $I_{exp}$ 315. The generator G(·) 395 fuses the features $z_{x_i}(I_{x_i})$ 355 from the image $I_{x_i}$ 335 with the attribute image $I_{att}$ 305 at multiple scales to change certain attributes of the virtual person and/or the scene depicted in the combined image Y 380 to match the attributes of the person and/or scene depicted in the image $I_{x_i}$ 335, such as hairstyle, eye color, accessories (e.g., glasses, jewelry).

The image synthesis engine 300 can be an example of the image combination engine 225, the reconstruction engine 255, the image synthesis engine 520, the image synthesis engine 615, or a combination thereof. In an illustrative example based on the imaging system 200 of FIG. 2A and/or the imaging system 250 of FIG. 2B, the attribute image $I_{att}$ 305 is an example of the attribute image(s) 215, the identity image $I_{id}$ 310 is an example of the identity image(s) 210, the expression image $I_{exp}$ 315 is an example of the expression image(s) 220, and the combined image Y 380 is an example of the combined image(s) 230. In an illustrative example based on the imaging system 250 of FIG. 2B, the attribute image $I_{att}$ 305, the identity image $I_{id}$ 310, the expression image $I_{exp}$ 315, and the one or more other images $I_{x_i}$ 335 are examples of different combined images 230, and the combined image Y 380 is an example of one of the reconstructed images 285 (e.g., the reconstructed identity image(s) 260, the reconstructed attribute image(s) 265, the reconstructed expression image(s) 270).

Figure 5B:
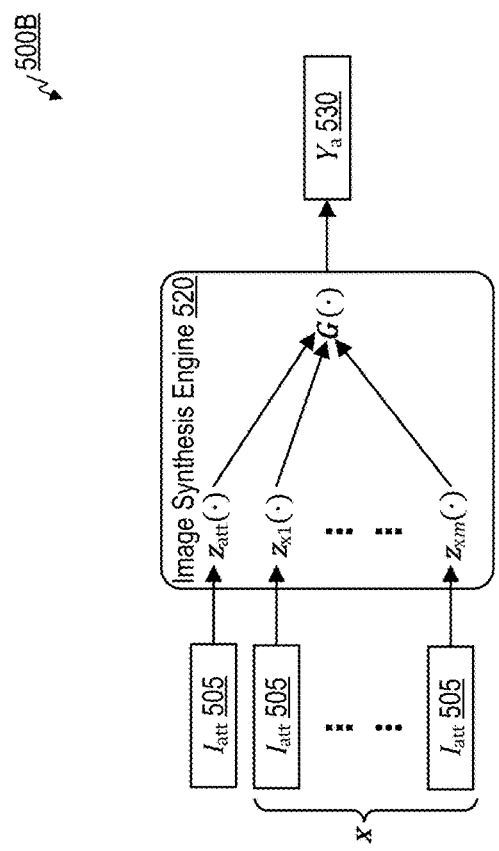
FIG. 5B is a block diagram illustrating an example of use of an image synthesis engine to generate a reconstructed image $Y_a$ based on multiple inputs of the same image, $I_{att}$, in accordance with some examples.
Figure 5A:
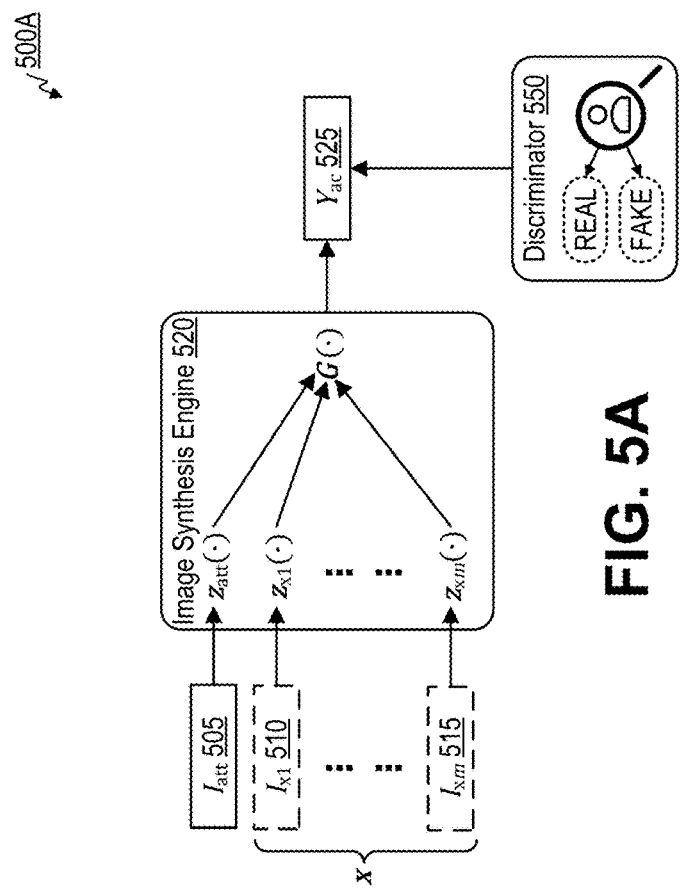
FIG. 5A is a block diagram illustrating an example of use of an image synthesis engine to generate a combined image $Y_{ac}$ based on different input images, such as $I_{att}$ and $I_{x_1}$ through $I_{x_m}$, in accordance with some examples.

In an illustrative example based on the imaging system of FIG. 5A, the attribute image $I_{att}$ 505 is an example of the attribute image $I_{att}$ 305, one of the images $I_{x_1}$ 510 through $I_{x_m}$ 515 is an example of the identity image $I_{id}$ 310, another one of the images $I_{x_1}$ 510 through $I_{x_m}$ 515 is an example of the expression image $I_{exp}$ 315, and the combined image $Y_{ac}$ 525 is an example of the combined image Y 380. In an illustrative example based on the imaging system of FIG. 5B, the attribute image $I_{att}$ 505 is an example of the attribute image $I_{att}$ 305, the identity image $I_{id}$ 310, and the expression image $I_{exp}$ 315; and the reconstructed image $Y_a$ 530 is an example of the combined image Y 380.

Figure 6B:
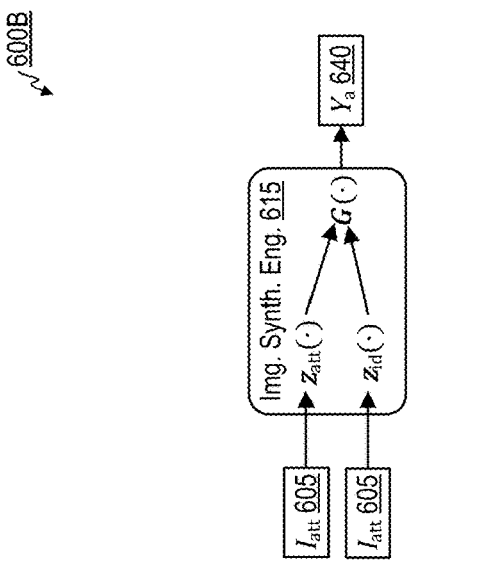
FIG. 6B is a block diagram illustrating an example of use of an image synthesis engine to generate a reconstructed image $Y_a$ based on multiple inputs of the same image, $I_{att}$, in accordance with some examples.
Figure 6A:
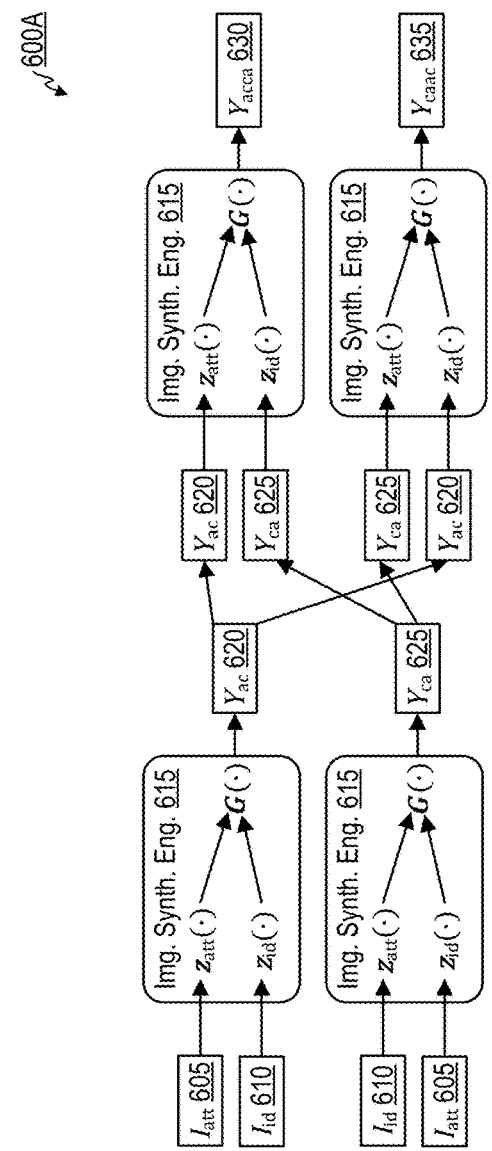
FIG. 6A is a block diagram illustrating an example of use of an image synthesis engine to generate combined images $Y_{ac}$ and $Y_{ca}$ based on input images $I_{att}$ and $I_{id}$, and to generate reconstructed images $Y_{acca}$ and $Y_{caac}$ based on the combined images, in accordance with some examples.

In a first illustrative example based on the imaging system of FIG. 6A, the attribute image $I_{att}$ 605 is an example of the attribute image $I_{att}$ 305, the identity image $I_{id}$ 610 is an example of the identity image $I_{id}$ 310, and the combined image $Y_{ac}$ 620 is an example of the combined image Y 380. In a second illustrative example based on the imaging system of FIG. 6A, the identity image $I_{id}$ 610 is used in place of the attribute image $I_{att}$ 305, the attribute image $I_{att}$ 605 is used in place of the identity image $I_{id}$ 310, and the combined image $Y_{ca}$ 625 is an example of the resulting combined image Y 380. In a third illustrative example based on the imaging system of FIG. 6A, the combined image $Y_{ac}$ 620 is used in place of the attribute image $I_{att}$ 305, the combined image $Y_{ca}$ 625 is used in place of the identity image $I_{id}$ 310, and the reconstructed image $Y_{acca}$ 630 is an example of the resulting combined image Y 380. In a fourth illustrative example based on the imaging system of FIG. 6A, the combined image $Y_{ca}$ 625 is used in place of the attribute image $I_{att}$ 305, the combined image $Y_{ac}$ 620 is used in place of the identity image $I_{id}$ 310, and the reconstructed image $Y_{caac}$ 635 is an example of the resulting combined image Y 380. In an illustrative example based on the imaging system of FIG. 6B, the attribute image $I_{att}$ 605 is an example of the attribute image $I_{att}$ 305, the identity image $I_{id}$ 310, and the expression image $I_{exp}$ 315; and the reconstructed image $Y_a$ 640 is an example of the combined image Y 380.

FIG. 4 is a block diagram illustrating an example architecture of a multi-channel adaptive attentional denormalization (MC-AAD) layer system 400. The MC-AAD layer system 400 of FIG. 4 includes a MC-AAD layer 490, various inputs to the MC-AAD layer 490, and an output of the MC-AAD layer 490. The inputs to the MC-AAD layer 490 include the input tensor $h_{in}^k$ 420, the attribute feature tensor $z_{att}^k(I_{att})$ 405, the identity feature tensor $z_{id}(I_{id})$ 435, and/or the expression feature tensor $z_{exp}(I_{exp})$ 450. The identity feature tensor $z_{id}(I_{id})$ 435 of FIG. 4 is an example of the identity features $z_{id}(I_{id})$ 340 of FIG. 3. The expression feature tensor $z_{exp}(I_{exp})$ 450 of FIG. 4 is an example of the expression features $z_{exp}(I_{exp})$ 345 of FIG. 3. In some examples, the inputs to the MC-AAD layer 490 can also include a feature tensor corresponding to the features $z_{x_i}(I_{x_i})$ 355, fused with the attribute feature tensor $z_{att}^k(I_{att})$ 405 similarly to the identity feature tensor $z_{id}(I_{id})$ 435 and/or the expression feature tensor $z_{exp}(I_{exp})$ 450 as described herein. The output of the MC-AAD layer 490 is the output tensor $h_{out}^k$ 470. Feature tensors can include feature vectors and/or feature matrices.

The MC-AAD layer 490 receives the input tensor $h_{in}^k$ 420 from the generator G(·) 395. In some examples, the input tensor $h_{in}^k$ 420 can include an output of a previous MC-AAD layer and/or a previous MC-AAD residual block. In some examples, the input tensor $h_{in}^k$ 420 can include identity feature tensor $z_{id}(I_{id})$ 435, the expression feature tensor $z_{exp}(I_{exp})$ 450, the feature tensor corresponding to the features $z_{x_i}(I_{x_i})$ 355, or a combination thereof.

The MC-AAD layer 490 is configured to, and can, integrate the attribute feature tensor $Z_{att}^k(I_{att})$ 405 with other feature tensors $z_{x_i}(I_{x_i})$ from the pre-trained encoders, such as the identity feature tensor $z_{id}(I_{id})$ 435, the expression feature tensor $z_{exp}(I_{exp})$ 450, the feature tensor $z_{x_i}(I_{x_i})$ corresponding to the features $z_{x_i}(I_{x_i})$ 355, or a combination thereof. The attribute feature tensor $Z_{att}^k(I_{att})$ 405 is a 3-D attribute feature tensor extracted from the attribute image $I_{att}$ 305 using the multi-level attribute encoder $z_{att}(\cdot)$ 390, and provides feature information for attributes that are to be maintained at $k^{th}$ scale. For each value of i, where $x_i \in x$, $z_{x_i}(I_{x_i})$, is a 1-dimensional (1–D) feature tensor (e.g., feature vector) extracted from a source image $I_{x_i}$ and provides information about the attributes that are to be changed in the attribute image $I_{att}$ 305 and/or in the attribute feature tensor $z_{att}^k(I_{att})$ 405. Examples of $z_{x_i}(I_{x_i})$ include the identity feature tensor $z_{id}(I_{id})$ 435 and the expression feature tensor $z_{exp}(I_{exp})$ 450.

The MC-AAD layer 490 is at the $k^{th}$ scale or level along a range from 1 to n. The MC-AAD layer 490 receives the input tensor $h_{in}^k$ 420 from the generator GO 395. The dimensions of the input tensor $h_{in}^k$ 420 are denoted as $C^k \times H^k \times W^k$.

The MC-AAD layer 490 performs denormalization is performed on the input tensor $h_{in}^k$ 420 to obtain the denormalized input tensor $\bar{h}^k$ 425, by calculating:

$$\bar{h}^k = (h_{in}^k - \mu^k)/\sigma^k$$

Here, $\mu^k \in \mathbb{R}^{C_k \times 1 \times 1}$ is the mean, and $\sigma^k \in \mathbb{R}^{C_k \times 1 \times 1}$ is the standard deviation of the input tensor $h_{in}^k$ 420 computed along image width and height dimensions.

The MC-AAD layer 490 is configured to, and can, generate feature maps based on the attribute feature tensor $z_{att}^k(I_{att})$ 405, the identity feature tensor $z_{id}(I_{id})$ 435, and the expression feature tensor $z_{exp}(I_{exp})$ 450. The MC-AAD layer 490 performs two convolutions using the attribute feature tensor $z_{att}^k(I_{att})$ 405 to generate feature map $\beta_{att}^k$ 410 and feature map $\gamma_{att}^k$ 415. The MC-AAD layer 490 performs convolutions using fully connected (FC) convolutional layers using the identity feature tensor $z_{id}(I_{id})$ 435 to generate feature map $\beta_{id}^k$ 445 and feature map $\gamma_{id}^k$ 440. The MC-AAD layer 490 performs convolutions using fully connected (FC) convolutional layers using the identity feature tensor $z_{exp}(I_{exp})$ 450 to generate feature map $\beta_{exp}^k$ 460 and feature map $\gamma_{exp}^k$ 455.

The MC-AAD layer 490 uses the feature maps to feed the denormalized input tensor $\bar{h}^k$ 425 into multiple branches for identity feature tensor $z_{id}(I_{id})$ 435 and the expression feature tensor $z_{exp}(I_{exp})$ 450, respectively, for feature embedding. The MC-AAD layer 490 integrates the embedded features through attention-based fusion.

The MC-AAD layer 490 multiplies the denormalized input tensor $\bar{h}^k$ 425 by the feature map $\gamma_{att}^k$ 415 and adds the feature map $\beta_{att}^k$ 405 to the product to renormalize the denormalized input tensor $\bar{h}^k$ 425 and integrate the attribute feature tensor $z_{att}^k(I_{att})$ 405 (with dimensions $C_{att}^k \times H^k \times W^k$) as attribute feature $A^k$ using the following equation:

$$A^k = \gamma_{Att}^k \times \bar{h}^k + \beta_{Att}^k$$

where the feature map $\gamma_{Att}^k \in \mathbb{R}^{C_k \times H_k \times W_k}$ and the feature map $\beta_{Att}^k \in \mathbb{R}^{C_k \times H_k \times W_k}$ are convolved from the attribute feature tensor $z_{att}^k$ 405 by convolutional layers. In this equation to generate the attribute feature $A^k$, the feature map $\gamma_{att}^k$ 415 estimates a mean value, while the feature map $\beta_{att}^k$ 410 estimates a standard deviation value.

The MC-AAD layer 490 multiplies the denormalized input tensor $\bar{h}^k$ 425 by the feature map $\gamma_{id}^k$ 440 and adds the feature map $\beta_{id}^k$ 445 to the product to renormalize the denormalized input tensor $\bar{h}^k$ 425 and integrate the identity feature tensor $z_{id}(I_{id})$ 435 (with dimensions $C_{id}^k \times 1 \times 1$) as identity feature $I^k$ using the following equation:

$$I^k = \gamma_{id}^k \times \bar{h}^k + \beta_{id}^k$$

Here, the feature map $\gamma_{id}^k \in \mathbb{R}^{C_k \times 1 \times 1}$ and $\beta_{id}^k \in \mathbb{R}^{C_k \times 1 \times 1}$ are computed from the identity feature tensor $z_{id}$ 435 using fully connected (FC) layers. In this equation to generate the identity feature $I^k$, the feature map $\gamma_{id}^k$ 440 estimates a mean value, while the feature map $\beta_{id}^k$ 415 estimates a standard deviation value.

The MC-AAD layer 490 multiplies the denormalized input tensor $\bar{h}^k$ 425 by the feature map $\gamma_{exp}^k$ 455 and adds the feature map $\beta_{exp}^k$ 460 to the product to renormalize the denormalized input tensor $\bar{h}^k$ 425 and integrate the expression feature tensor $z_{exp}(I_{exp})$ 450 (with dimensions $C_{exp}^k \times 1 \times 1$) as expression feature $E^k$ using the following equation:

$$E^k = \gamma_{exp}^k \times \bar{h}^k + \beta_{exp}^k$$

Here, the feature map $\gamma_{exp}^k \in \mathbb{R}^{C_k \times 1 \times 1}$ and $\beta_{exp}^k \in \mathbb{R}^{C_k \times 1 \times 1}$ are computed from the expression feature tensor $z_{exp}$ 450 using fully connected (FC) layers. In this equation to generate the expression feature $E^k$, the feature map $\gamma_{exp}^k$ 455 estimates a mean value, while the feature map $\beta_{exp}^k$ 460 estimates a standard deviation value.

The MC-AAD layer 490 can perform feature embedding for any number of adjusted attributes, with feature tensors $z_{x_i} \in$ $$\mathbb{R}^{C_{x_i}}$$

being integrated into the generator as feature $E_{x_i}^k$ using the following equation:

$$E_{x_i}^k = \gamma_{x_i}^k \times \bar{h}^k + \beta_{x_i}^k, x_i \in x = \{id, \exp, \dots\}$$

Here, $\gamma_{x_i}^k \in \mathbb{R}^{C_k \times 1 \times 1}$ and $\beta_{x_i}^k \in \mathbb{R}^{C_k \times 1 \times 1}$ are computed from $z_{x_i}$ through fully connected (FC) layers.

In some cases, the number of attributes to be adjusted, x, is greater than or equal to two, or $|x| \geq 2$. In such cases, the MC-AAD layer 490 generates $|x|+1$ attention masks $M_i^k$, where $i = 0, 1, \dots, |x|$, for each of the embedded features. As illustrated in FIG. 4, the MC-AAD layer 490 generates a mask tensor $M^k$ 430, where $M^k \in \mathbb{R}^{(|x|+1) \times H_k \times W_k}$, based on the denormalized input tensor $\bar{h}^k$ 425 using convolutional layer(s). Each slice of the mask tensor $M^k$ 430 along the channel dimension is $M_i^k$. The MC-AAD layer 490 can apply a softmax function is applied on all masks of the mask tensor $M^k$ 430, so that the sum of mask values at a position (h, w) across all channels is equal to one, as indicated in the equation below:

$$M_{i,(h,w)}^k = \frac{e^{M_{i,(h,w)}^k}}{\sum_{k=0}^{|x|} e^{M_{i,(h,w)}^k}}$$

In some cases, the number of attributes to be adjusted, x, is equal to one, or $|x|=1$. In such cases, the MC-AAD layer 490 generates the mask tensor $M^k$ 430 to have only one attention mask $M_0^k \in \mathbb{R}^{(|x|+1) \times H_k \times W_k}$, based on the denormalized input tensor $\bar{h}^k$ 425 using convolution. The MC-AAD layer 490 applies a sigmoid function is applied to the result, to constrain pixel values to be within the range (0,1).

The MC-AAD layer 490 can fuse all of the features using the fusion equation 465 to generate the output tensor $h_{out}^k$ 470. In cases where the identity feature $I^k$ and the expression feature $E^k$ are generated based on the identity feature tensor $z_{id}(I_{id})$ 435 and/or the expression feature tensor $z_{exp}(I_{exp})$ 450, respectively, the fusion equation 465 can be expressed as follows:

$$h_{out}^k = M_1^k \times A^k + M_2^k \times I^k + M_3^k \times E^k$$

In cases where features $E_{x_i}^k$ are generated based on feature tensors $z_{x_i} \in$ $$\mathbb{R}^{C_{x_i}},$$

equation 465 can be expressed as follows:

$$h_{out}^k = M_0^k \times A^k + \sum_{\substack{x_i \in x \\ i=1,2,\dots,|x|}} M_i^k \times E_{x_i}^k$$

$$h_{out}^k = \begin{cases} M_0^k \times A^k + \sum_{\substack{x_i \in x \\ i=1,2,\dots,|x|}} M_i^k \times E_{x_i}^k, & \text{if } |x| \geq 2 \\ M_0^k \times A^k + (1 - M_0^k) \times E_{x_1}^k, & \text{if } |x| = 1 \end{cases}$$

The output tensor $h_{out}^k$ 470 can serve as the input tensor $h_{in}^{k+1}$ for the next MC-AAD layer after the MC-AAD layer 490. If k=n, the output tensor $h_{out}^k$ 470 can serve as the combined image Y 380.

Ultimately, the MC-AAD layer 490 adaptively adjusts the effective regions of attributes from the source image(s) to the combined image Y 380 so that these attributes can participate in synthesizing different parts of the face for the combined image Y 380.

FIG. 5A is a block diagram 500A illustrating an example of use of an image synthesis engine 520 to generate a combined image $Y_{ac}$ 525 based on different input images, such as $I_{att}$ 505 and $I_{x_1}$ 510 through $I_{x_m}$ 515. Input image $I_{att}$ 505 is the base image that the image synthesis engine 520 modifies based on features extracted from input images $I_{x_1}$ 510 through $I_{x_m}$ 515 to generate the combined image $Y_{ac}$ 525. The input images $I_{x_1}$ 510 through $I_{x_m}$ 515 are used as attribute sources for attributes to be changed relative to the input image $I_{att}$ 505, which are distinct from the attributes to be maintained from input image $I_{att}$ 505.

The image synthesis process illustrated in the block diagram 500A of FIG. 5A can be written as:

$$Y_{ac} = G(z_{att}(I_{att}), z_{x_1}(I_{x_1}), \ldots, z_{x_m}(I_{x_m}))$$

In some examples, imaging system (e.g., imaging system 200 or imaging system 250) can train the image synthesis engine 520 using the image synthesis process illustrated in the block diagram 500A of FIG. 5A. To train the image synthesis engine 520 using the image synthesis process illustrated in the block diagram 500A of FIG. 5A, various loss functions may be used.

A first example of a loss function for training the image synthesis engine 520 using the image synthesis process illustrated in the block diagram 500A of FIG. 5A is attribute loss $\mathcal{L}_{att}$. Training of the image synthesis engine 520 based on the loss function for the attribute loss $\mathcal{L}_{att}$ trains the image synthesis engine 520 to preserve the attribute information from the input image $I_{att}$ in the synthesized image according to the following equation:

$$\mathcal{L}_{att-ac} = \frac{1}{2} \sum_{k=1}^{n} \left\| z_{att}^k(I_{att}) - z_{att}^k(Y_{ac}) \right\|_2^2$$

Because $z_{att}^k(I_{att})$ 1 represent features from the input image $I_{att}$ 505 that are to be maintained in the combined image $Y_{ac}$ 525, $z_{att}^k(Y_{ac})$ is similar to $z_{att}^k(I_{att})$, and thus the attribute loss $\mathcal{L}_{att}$ is minimized.

A second example of a loss function for training the image synthesis engine 520 using the image synthesis process illustrated in the block diagram 500A of FIG. 5A includes feature losses $\mathcal{L}_{x_i}$ for each attribute $x_i \in x$ that is to be adjusted from the input image $I_{att}$ 505 to generate the combined image $Y_{ac}$ 525. Training of the image synthesis engine 520 based on the loss functions for the feature losses $\mathcal{L}_{x_i}$ trains the image synthesis engine 520 to adjust these attributes from the input image $I_{att}$ 505 to generate the combined image $Y_{ac}$ 525 according to the following equation:

$$\mathcal{L}_{x_i-ac} = F(z_{x_i}(I_{x_i}), z_{x_i}(Y_{ac})), x_i \in x,$$

Here, F(·) is a similarity measurement function, such as a cosine similarity function or a means squared error function. Because $z_{x_i}(I_{x_i})$ represent features from the input image $I_{x_i}$ that are to be incorporated into the combined image $Y_{ac}$ 525, $z_{x_i}(Y_{ac})$ are similar to $z_{x_i}(I_{x_i})$, and thus the feature losses $\mathcal{L}_{x_i}$ are either minimized to indicate a low amount of differences between $z_{x_i}(I_{x_i})$ and $z_{x_i}(Y_{ac})$, or are maximized to indicate a high amount of similarity between $z_{x_i}(I_{x_i})$ and $z_{x_i}(Y_{ac})$.

A third example of a loss function for training the image synthesis engine 520 using the image synthesis process illustrated in the block diagram 500A of FIG. 5A includes adversarial loss $\mathcal{L}_{adv}$. A multi-scale discriminator 550 is included to distinguish images of synthesized (e.g., "fake") people and/or faces from images of real people and/or faces in the training dataset. The discriminator 550 may include one or more ML systems and/or ML models, such as one or more NNs, one or more CNNs, one or more TDNNs, one or more deep networks, one or more autoencoders, one or more DBNs, one or more RNNs, one or more GANs, one or more trained SVMs, one or more trained RFs, one or more computer vision systems, one or more deep learning systems, or combinations thereof. In an illustrative example, the discriminator 550 may include a GAN. Adversarial loss $\mathcal{L}_{adv}$ is defined as a classification loss (e.g., binary cross entropy loss) in classification corresponding label ∈ {Real, Fake} between an input image I (e.g., image $I_{att}$ 505 and/or images $I_{x_1}$ 510 through $I_{x_m}$ 515) and the combined image $Y_{ac}$ 525, as indicated in the following equation:

$$\mathcal{L}_{adv}(I, \text{label}) = \text{Classification}(I, \text{label})$$

Training of the one or more ML models used by the discriminator 550 based on the loss function for the adversarial loss $\mathcal{L}_{adv}$ trains the discriminator 550 to minimize classification error $\mathcal{L}_{DIS}$. For instance, with classification error minimized, an image with a real person such as image $I_{att}$ 505 is to be classified as real, while an image with a synthesized or virtual person such as the combined image $Y_{ac}$ 525 is to be classified as synthesized or fake. Training of the one or more ML models used by the discriminator 550 based on the loss function for the adversarial loss $\mathcal{L}_{adv}$ trains the discriminator 550 to minimize classification error $\mathcal{L}_{DIs}$ according to the following equation:

$$\mathcal{L}_{DIS} = \mathcal{L}_{adv}(I_{att}, \text{Real}) + \mathcal{L}_{adv}(Y_{ac}, \text{Fake})$$

On the other hand, training of the image synthesis engine 520 based on the loss function for the adversarial loss $\mathcal{L}_{adv}$ trains the image synthesis engine 520 to maximize classification error $\mathcal{L}_{DIS}$, at least with respect to classifying the combined image $Y_{ac}$ 525 as real instead of classifying the combined image $Y_{ac}$ 525 as synthesized or fake. In some examples, one or more ML models used by the discriminator 550 are at least partially distinct from the one or more ML models used by other elements such as the image synthesis engine 520. The discriminator 550 and the image synthesis engine 520 may be trained side by side, so that as the discriminator 550 becomes more sophisticated, the image synthesis engine 520 also improves in order to continue fooling the discriminator 550 into classifying the combined image $Y_{ac}$ 525 as real instead of classifying the combined image $Y_{ac}$ 525 as synthesized or fake. In some examples, the one or more ML models used by the discriminator 550 are at least partially shared with the one or more ML models used by other elements such as the image synthesis engine 520.

The attribute image $I_{att}$ 505 is an example of the attribute image $I_{att}$ 305, one of the images $I_{x_1}$ 510 through $I_{x_m}$ 515 is an example of the identity image $I_{id}$ 310, another one of the images $I_{x_1}$ 510 through $I_{x_m}$ 515 is an example of the expression image $I_{exp}$ 315, and the combined image $Y_{ac}$ 525 is an example of the combined image Y 380.

FIG. 5B is a block diagram 500B illustrating an example of use of an image synthesis engine 520 to generate a reconstructed image $Y_a$ 530 based on multiple inputs of the same image, $I_{att}$ 505. In the image reconstruction process of FIG. 5B, the input image $I_{att}$ 505 acts as both the base image that the image synthesis engine 520 modifies, as well as each of the input images from which the synthesis engine 520 uses extracted features from to generate the reconstructed image $Y_a$ 530. Thus, to generate the reconstructed image $Y_a$ 530, the synthesis engine 520 modifies the input image $I_{att}$ 505 to incorporate features from the input image $I_{att}$ 505. Accordingly, the reconstructed image $Y_a$ 530 is generated to be similar to, or to match, the input image $I_{att}$ 505.

In some examples, imaging system (e.g., imaging system 200 or imaging system 250) can train the image synthesis engine 520 using the image reconstruction process illustrated in the block diagram 500B of FIG. 5B. To train the image synthesis engine 520 using the image reconstruction process illustrated in the block diagram 500B of FIG. 5B, various loss functions may be used.

One example of a loss function for training the image synthesis engine 520 using the image reconstruction process illustrated in the block diagram 500B of FIG. 5B is reconstruction loss $\mathcal{L}_{rec}$. Training of the image synthesis engine 520 based on the loss function for the reconstruction loss $\mathcal{L}_{rec}$ trains the image synthesis engine 520 to reconstruct the reconstructed image $Y_a$ 530 to be similar to, or to match, the input images $I_{att}$ 505, according to the following equations:

$$\mathcal{L}_{rec-a} = \frac{1}{2}\|Y_a - I_{att}\|_2^2$$

$$\mathcal{L}_{rec-x_i} = \frac{1}{2}\|Y_i - I_{x_i}\|_2^2, x_i \in x$$

Because the reconstructed image $Y_a$ 530 is similar to, or matches, the input images $I_{att}$ 505, the reconstruction loss $\mathcal{L}_{rec}$ is minimized.

Other examples of loss functions for training the image synthesis engine 520 using the image reconstruction process illustrated in the block diagram 500B of FIG. 5B include the loss functions described above with respect to using the image synthesis process illustrated in the block diagram 500A of FIG. 5A, including attribute loss $\mathcal{L}_{att}$, feature losses $\mathcal{L}_{x_i}$, adversarial loss $\mathcal{L}_{adv}$, classification error $\mathcal{L}_{DIS}$, or a combination thereof.

In some examples, imaging system (e.g., imaging system 200 or imaging system 250) can train the image synthesis engine 520 using a combination of the image synthesis process illustrated in the block diagram 500A of FIG. 5A and the image reconstruction process illustrated in the block diagram 500B of FIG. 5B. A total loss function $\mathcal{L}_{GEN}$ may incorporate reconstruction loss $\mathcal{L}_{rec}$ weighted by an associated reconstruction coefficient $\lambda_{rec}$, attribute loss $\mathcal{L}_{att}$ weighted by an associated attribute coefficient $\lambda_{att}$, feature losses $\mathcal{L}_{x_i}$ weighted by an associated feature coefficient $\lambda_{feat}$, and/or adversarial loss $\mathcal{L}_{adv}$ weighted by an associated adversarial coefficient $\lambda_{adv}$, for instance according to the following equation:

$$\mathcal{L}_{GEN} = \lambda_{rec}\left(\mathcal{L}_{rec-a} + \sum_{x_i \in x}\mathcal{L}_{rec-x_i}\right) + \lambda_{att}\mathcal{L}_{att-ac} + \lambda_{feat}\sum_{x_i \in x}\mathcal{L}_{x_i-ac} + \lambda_{adv}\mathcal{L}_{adv}(Y_{ac}, \text{Real})$$

Minimizing loss according to the total loss function $\mathcal{L}_{GEN}$ provides the improvements of training the image synthesis engine 520 using each of the loss functions of FIGS. 5A-5B, combined.

The attribute image $I_{att}$ 505 is an example of the attribute image $I_{att}$ 305, the identity image $I_{id}$ 310, and the expression image $I_{exp}$ 315; and the reconstructed image $Y_a$ 530 is an example of the combined image Y 380.

FIG. 6A is a block diagram 600A illustrating an example of use of an image synthesis engine 615 to generate combined images $Y_{ac}$ 620 and $Y_{ca}$ 625 based on input images $I_{att}$ 605 and $I_{id}$ 610, and to generate reconstructed images $Y_{acca}$ 630 and $Y_{caac}$ 635 based on the combined images. The process illustrated in FIG. 6A may be referred to as a cycle reconstruction process or a cycle consistency process, and is an example of generation of combined images 230 based on source images 280, and generation of reconstructed images 285 based on the combined images 230, as in FIG. 2B. The cycle reconstruction process or cycle consistency process can be applied in model training to enhance the adjustment of attributes, make combined images more realistic, and make application of identities, attributes, and/or expressions work more consistently and reliably.

The attribute image $I_{att}$ 605 is the base image that the image synthesis engine 615 maintains attributes from and modifies based on features (e.g., identity features or other attributes) extracted from the identity image $I_{id}$ 610 to generate the combined image $Y_{ac}$ 620. The identity image $I_{id}$ 610 is the base image that the image synthesis engine 615 maintains attributes from and modifies based on features (e.g., identity features or other attributes) extracted from the attribute image $I_{att}$ 605 to generate the combined image $Y_{ca}$ 625.

The combined image $Y_{ac}$ 620 is the base image that the image synthesis engine 615 maintains attributes from and modifies based on features (e.g., identity features or other attributes) extracted from the combined image $Y_{ca}$ 625 to generate the reconstructed image $Y_{acca}$ 630. The combined image $Y_{ca}$ 625 is the base image that the image synthesis engine 615 maintains attributes from and modifies based on features (e.g., identity features or other attributes) extracted from the combined image $Y_{ac}$ 620 to generate the reconstructed image $Y_{caac}$ 635.

The reconstructed image $Y_{acca}$ 630 is a reconstructed version of the attribute image $I_{att}$ 605 generated using the image synthesis engine 615 based on the combined image $Y_{ac}$ 620 and the combined image $Y_{ca}$ 625. The reconstructed image $Y_{caac}$ 635 is a reconstructed version of the identity image $I_{id}$ 610 generated using the image synthesis engine 615 based on the combined image $Y_{ca}$ 625 and the combined image $Y_{ac}$ 620. This reconstruction process may be referred to as cycle reconstruction, and may be defined using the following equations:

$$Y_{ac} = G(z_{att}(I_{att}), z_{id}(I_{id}))$$

$$Y_{ca} = G(z_{att}(I_{id}), z_{id}(I_{att}))$$

$$Y_{acca} = G(z_{att}(Y_{ac}), z_{id}(Y_{ca}))$$

$$Y_{caac} = G(z_{att}(Y_{ca}), z_{id}(Y_{ac}))$$

In some examples, imaging system (e.g., imaging system 200 or imaging system 250) can train the image synthesis engine 615 using the cycle reconstruction process illustrated in the block diagram 600A of FIG. 6A. To train the image synthesis engine 615 using the image synthesis process illustrated in the block diagram 600A of FIG. 6A, various loss functions may be used.

One example of a loss function for training the image synthesis engine 615 using the image reconstruction process illustrated in the block diagram 600B of FIG. 6A is cycle reconstruction loss $\mathcal{L}_{cyc}$. Training of the image synthesis engine 615 based on the loss function for the cycle reconstruction loss $\mathcal{L}_{cyc}$ trains the image synthesis engine 615 to reconstruct the reconstructed image $Y_{acca}$ 630 to be similar to, or to match, the attribute image $I_{att}$ 605, and to reconstruct the reconstructed image $Y_{caac}$ 635 to be similar to, or to match, the identity image $I_{id}$ 610, according to the following equations:

$$\mathcal{L}_{cyc-acca} = \frac{1}{2} \|Y_{acca} - I_{att}\|_2^2$$

$$\mathcal{L}_{cyc-caac} = \frac{1}{2} \|Y_{caac} - I_{id}\|_2^2$$

Because the reconstructed image $Y_{acca}$ 630 is similar to, or matches, the attribute image $I_{att}$ 605, the cycle reconstruction loss $\mathcal{L}_{cyc-acca}$ is minimized. Because the reconstructed image $Y_{caac}$ 635 is similar to, or matches, the identity image $I_{id}$ 610, the cycle reconstruction loss $\mathcal{L}_{cyc-caac}$ is minimized.

In some examples, the training the image synthesis engine 615 using the image reconstruction process illustrated in the block diagram 600B of FIG. 6A may use any of the types of loss functions described with respect to FIGS. 5A-5B, such as attribute loss $\mathcal{L}_{att}$, feature losses $\mathcal{L}_{x_i}$, adversarial loss Lady, classification error $\mathcal{L}_{DIS}$, reconstruction loss $\mathcal{L}_{rec}$, total loss $\mathcal{L}_{GEN}$, or a combination thereof.

In a first illustrative example, the attribute image $I_{att}$ 605 is an example of the attribute image $I_{att}$ 305, the identity image $I_{id}$ 610 is an example of the identity image $I_{id}$ 310, and the combined image $Y_{ac}$ 620 is an example of the combined image Y 380. In a second illustrative example, the identity image $I_{id}$ 610 is used in place of the attribute image $I_{att}$ 305, the attribute image $I_{att}$ 605 is used in place of the identity image $I_{id}$ 310, and the combined image $Y_{ca}$ 625 is an example of the resulting combined image Y 380. In a third illustrative example, the combined image $Y_{ac}$ 620 is used in place of the attribute image $I_{att}$ 305, the combined image $Y_{ca}$ 625 is used in place of the identity image $I_{id}$ 310, and the reconstructed image $Y_{acca}$ 630 is an example of the resulting combined image Y 380. In a fourth illustrative example, the combined image $Y_{ca}$ 625 is used in place of the attribute image $I_{att}$ 305, the combined image $Y_{ac}$ 620 is used in place of the identity image $I_{id}$ 310, and the reconstructed image $Y_{caac}$ 635 is an example of the resulting combined image Y 380.

FIG. 6B is a block diagram 600B illustrating an example of use of an image synthesis engine 615 to generate a reconstructed image $Y_a$ 640 based on multiple inputs of the same image, $I_{att}$ 605. In the image reconstruction process of FIG. 6B, the input image $I_{att}$ 605 acts as both the attribute image that the image synthesis engine 615 modifies, as well as the identity image from which the synthesis engine 615 uses extracted features (e.g., identity features) from to generate the reconstructed image $Y_a$ 640. Thus, to generate the reconstructed image $Y_a$ 640, the synthesis engine 615 modifies the input image $I_{att}$ 605 to incorporate features from the input image $I_{att}$ 605. Accordingly, the reconstructed image $Y_a$ 640 is generated to be similar to, or to match, the input image $I_{att}$ 605. This reconstruction process may be defined using the following equations:

$$Y_a = G(z_{att}(I_{att}), z_{id}(I_{att}))$$

$$Y_i = G(z_{att}(I_{id}), z_{id}(I_{id}))$$

In some examples, imaging system (e.g., imaging system 200 or imaging system 250) can train the image synthesis engine 615 using the image reconstruction process illustrated in the block diagram 600B of FIG. 6B. To train the image synthesis engine 615 using the image reconstruction process illustrated in the block diagram 600B of FIG. 6B, any of the loss functions described with respect to FIG. 5B may be used, such as reconstruction loss $\mathcal{L}_{rec}$, attribute loss $\mathcal{L}_{att}$, feature losses $\mathcal{L}_{x_i}$, adversarial loss $\mathcal{L}_{adv}$, classification error $\mathcal{L}_{DIS}$, total loss $\mathcal{L}_{GEN}$, or a combination thereof.

In some examples, imaging system (e.g., imaging system 200 or imaging system 250) can train the image synthesis engine 615 using a combination of the image synthesis process illustrated in the block diagram 600A of FIG. 6A and the image reconstruction process illustrated in the block diagram 600B of FIG. 6B. A total loss function $\mathcal{L}_{GEN}$ may incorporate cycle reconstruction loss $\mathcal{L}_{cyc}$ weighted by an associated cycle reconstruction coefficient $\lambda_{cyc}$, reconstruction loss $\mathcal{L}_{rec}$ weighted by an associated reconstruction coefficient $\lambda_{rec}$, attribute loss $\mathcal{L}_{att}$ weighted by an associated attribute coefficient $\lambda_{att}$, feature losses $\mathcal{L}_{x_i}$ weighted by an associated feature coefficient $\Delta_{fear}$, and/or adversarial loss $\mathcal{L}_{adv}$ weighted by an associated adversarial coefficient $\lambda_{adv}$, for instance according to the following equation:

$$\mathcal{L}_{GEN} = \lambda_{rec}(\mathcal{L}_{rec-a} + \mathcal{L}_{rec-id}) + \lambda_{att}(\mathcal{L}_{att-ac} + \mathcal{L}_{att-ca}) + \lambda_{feat}(\mathcal{L}_{id-ac} + \mathcal{L}_{id-ca}) + \lambda_{cyc}(\mathcal{L}_{cyc-acca} + \mathcal{L}_{cyc-caac}) + \lambda_{adv}(\mathcal{L}_{adv}(Y_{ac}, \text{Real}) + \mathcal{L}_{adv}(Y_{ca}, \text{Real}))$$

Minimizing loss according to the total loss function $\mathcal{L}_{GEN}$ provides the improvements of training the image synthesis engine 615 using each of the loss functions of FIGS. 6A-6B, combined.

In an illustrative example based on the imaging system of FIG. 6B, the attribute image $I_{att}$ 605 is an example of the attribute image $I_{att}$ 305, the identity image $I_{id}$ 310, and the expression image $I_{exp}$ 315; and the reconstructed image $Y_a$ 640 is an example of the combined image Y 380.

FIG. 7 is a table 700 illustrating examples of use of an identity image $I_{id}$ 705 and an attribute image $I_{att}$ 710 to generate a combined image Y 715 and a combined image based on cycle reconstruction training $Y_r$ 720. The combined image based on cycle reconstruction training $Y_r$ 720 is generated using an imaging system 250 and/or image synthesis engine 615 that is trained using a cycle reconstruction process as described in FIG. 2B and/or FIGS. 6A-6B. The combined image Y 715 is generated using an imaging system 200 and/or image synthesis engine 520 that is trained without using a cycle reconstruction process. In most of the examples, the combined image based on cycle reconstruction training $Y_r$ 720 incorporates the attribute(s) of the attribute image $I_{att}$ 710 with the identity of the identity image $I_{id}$ 705 more clearly than the combined image Y 715.

The examples include an eye attribute example 725 in which the look of the eyes and eyelids in the attribute image $I_{att}$ 710, and the identity of the identity image $I_{id}$ 705, are incorporated into the combined image Y 715, and even more clearly in the combined image based on cycle reconstruction training $Y_r$ 720. In the glasses attribute example 730, the glasses in the attribute image $I_{att}$ 710, and the identity of the identity image $I_{id}$ 705, are incorporated into the combined image based on cycle reconstruction training $Y_r$ 720. In the hair attribute example 735, the hairstyle in the attribute image $I_{att}$ 710, and the identity of the identity image $I_{id}$ 705, are incorporated into the combined image Y 715, and even more clearly in the combined image based on cycle reconstruction training $Y_r$ 720. In the mouth attribute example 745, the style and/or expression of the mouth in the attribute image $I_{att}$ 710, and the identity of the identity image $I_{id}$ 705, are incorporated into the combined image Y 715, and even more clearly in the combined image based on cycle reconstruction training $Y_r$ 720. In the hair/expression attribute example 750, the hairstyle and/or facial expression of the person in the attribute image $I_{att}$ 710, and the identity of the identity image $I_{id}$ 705, are incorporated into the combined image Y 715, and even more clearly in the combined image based on cycle reconstruction training $Y_r$ 720. In the glasses attribute example 755, the glasses in the attribute image $I_{att}$ 710, and the identity of the identity image $I_{id}$ 705, are incorporated into the combined image based on cycle reconstruction training $Y_r$ 720. In the hair/expression attribute example 760, the hairstyle and/or facial expression of the person in the attribute image $I_{att}$ 710, and the identity of the identity image $I_{id}$ 705, are incorporated into the combined image Y 715, and even more clearly in the combined image based on cycle reconstruction training $Y_r$ 720. In the eye attribute example 765, the style and/or expression of the eyes in the attribute image $I_{att}$ 710, and the identity of the identity image $I_{id}$ 705, are incorporated into the combined image Y 715, and even more clearly in the combined image based on cycle reconstruction training $Y_r$ 720.

FIG. 8 is a table 800 illustrating additional examples of use of an identity image $I_{id}$ 805 and an attribute image $I_{att}$ 810 to generate a combined image Y 815 and a combined image based on cycle reconstruction training $Y_r$ 820. The combined image based on cycle reconstruction training $Y_r$ 820 is generated using an imaging system 250 and/or image synthesis engine 615 that is trained using a cycle reconstruction process as described in FIG. 2B and/or FIGS. 6A-6B. The combined image Y 815 is generated using an imaging system 200 and/or image synthesis engine 520 that is trained without using a cycle reconstruction process. In most of the examples, the combined image based on cycle reconstruction training $Y_r$ 820 incorporates the attribute(s) of the attribute image $I_{att}$ 810 with the identity of the identity image $I_{id}$ 805 more clearly than the combined image Y 815.

The examples include an eye/expression attribute example 825 in which the facial expression and/or the look of the eyes and eyelids in the attribute image $I_{att}$ 810, and the identity of the identity image $I_{id}$ 805, are incorporated into the combined image Y 815, and even more clearly in the combined image based on cycle reconstruction training $Y_r$ 820. In the eye/expression attribute example 830, the facial expression and/or the look of the eyes and eyelids in the attribute image $I_{att}$ 810, and the identity of the identity image $I_{id}$ 805, are incorporated into the combined image Y 815, and even more clearly in the combined image based on cycle reconstruction training $Y_r$ 820. In the eye/expression attribute example 835, the facial expression and/or the look of the eyes and eyelids in the attribute image $I_{att}$ 810, and the identity of the identity image $I_{id}$ 805, are incorporated into the combined image Y 815, and even more clearly in the combined image based on cycle reconstruction training $Y_r$ 820. In the eye attribute example 840, the facial expression and/or the look of the eyes and eyelids in the attribute image $I_{att}$ 810, and the identity of the identity image $I_{id}$ 805, are incorporated into the combined image Y 815, and even more clearly in the combined image based on cycle reconstruction training $Y_r$ 820. In the mouth attribute example 845, the facial expression and/or the look of the mouth in the attribute image $I_{att}$ 810, and the identity of the identity image $I_{id}$ 805, are incorporated into the combined image Y 815, and even more clearly in the combined image based on cycle reconstruction training $Y_r$ 820. In the mouth attribute example 850, the facial expression and/or the look of the mouth in the attribute image $I_{att}$ 810, and the identity of the identity image $I_{id}$ 805, are incorporated into the combined image Y 815, and even more clearly in the combined image based on cycle reconstruction training $Y_r$ 820. In the eye attribute example 855, the facial expression and/or the look of the mouth in the attribute image $I_{att}$ 810, and the identity of the identity image $I_{id}$ 805, are incorporated into the combined image Y 815, and even more clearly in the combined image based on cycle reconstruction training $Y_r$ 820. In the hair attribute example 860, the hairstyle in the attribute image $I_{att}$ 810, and the identity of the identity image $I_{id}$ 805, are incorporated into the combined image Y 815, and even more clearly in the combined image based on cycle reconstruction training $Y_r$ 820. In the forehead attribute example 865, the look of the forehead in the attribute image $I_{att}$ 810, and the identity of the identity image $I_{id}$ 805, are incorporated into the combined image Y 815, and even more clearly in the combined image based on cycle reconstruction training $Y_r$ 820.

FIG. 9 is a table 900 illustrating examples of use of an identity image $I_{id}$ 905, an expression image $I_{exp}$ 910, and an attribute image $I_{att}$ 915 to generate a combined image Y 920. The combined image Y 920 incorporates the attribute(s) of the attribute image $I_{att}$ 915 and the expression of the expression image $I_{exp}$ 910 with the identity of the identity image $I_{id}$ 905. In some examples, the combined image Y 920 may be a combined image based on cycle reconstruction training, like the combined image based on cycle reconstruction training $Y_r$ 720 or the combined image based on cycle reconstruction training $Y_r$ 820.

For example, in the example 925, the combined image Y 920 incorporates certain attribute(s) (e.g., facial pose, skin tone, environmental lighting, nose shape) of the attribute image $I_{att}$ 91, the expression (e.g., smiling and/or laughing, eyebrow shape and/or position) of the expression image $I_{exp}$ 910, and the identity (e.g., a middle-aged woman) of the identity image $I_{id}$ 905. In the example 930, the combined image Y 920 incorporates certain attribute(s) (e.g., facial pose, skin tone, environmental lighting, nasolabial folds) of the attribute image $I_{att}$ 910, the expression (e.g., smiling and/or grinning, eyebrow shape and/or position) of the expression image $I_{exp}$ 910, and the identity (e.g., a young man with beard) of the identity image $I_{id}$ 905. In the example 935, the combined image Y 920 incorporates certain attribute(s) (e.g., facial pose, skin tone) of the attribute image $I_{att}$ 910, the expression (e.g., mouth open and/or agape, eyebrow shape and/or position) of the expression image $I_{exp}$ 910, and the identity (e.g., middle-aged man) of the identity image $I_{id}$ 905. In the example 940, the combined image Y 920 incorporates certain attribute(s) (e.g., facial pose, skin tone, environmental lighting, eyebrow thickness) of the attribute image $I_{att}$ 910, the expression (e.g., mouth open in awe, eyebrow shape and/or position) of the expression image $I_{exp}$ 910, and the identity (e.g., young man without beard) of the identity image $I_{id}$ 905. In the example 945, the combined image Y 920 incorporates certain attribute(s) (e.g., facial pose, skin tone, environmental lighting, eyebrow color and thickness) of the attribute image $I_{att}$ 910, the expression (e.g., bewildered) of the expression image $I_{exp}$ 910, and the identity (e.g., older man) of the identity image $I_{id}$ 905. In the example 950, the combined image Y 920 incorporates certain attribute(s) (e.g., facial pose, skin tone, environmental lighting, eyebrow color and thickness) of the attribute image $I_{att}$ 910, the expression (e.g., mouth open with upper teeth showing) of the expression image $I_{exp}$ 910, and the identity (e.g., middle-aged man with glasses and beard) of the identity image $I_{id}$ 905. In the example 955, the combined image Y 920 incorporates certain attribute(s) (e.g., facial pose, skin tone, environmental lighting, eyebrow color and thickness) of the attribute image $I_{att}$ 910, the expression (e.g., smiling with open mouth, eyebrow shape and/or position) of the expression image $I_{exp}$ 910, and the identity (e.g., young man with beard) of the identity image $I_{id}$ 905.

Figure 10:
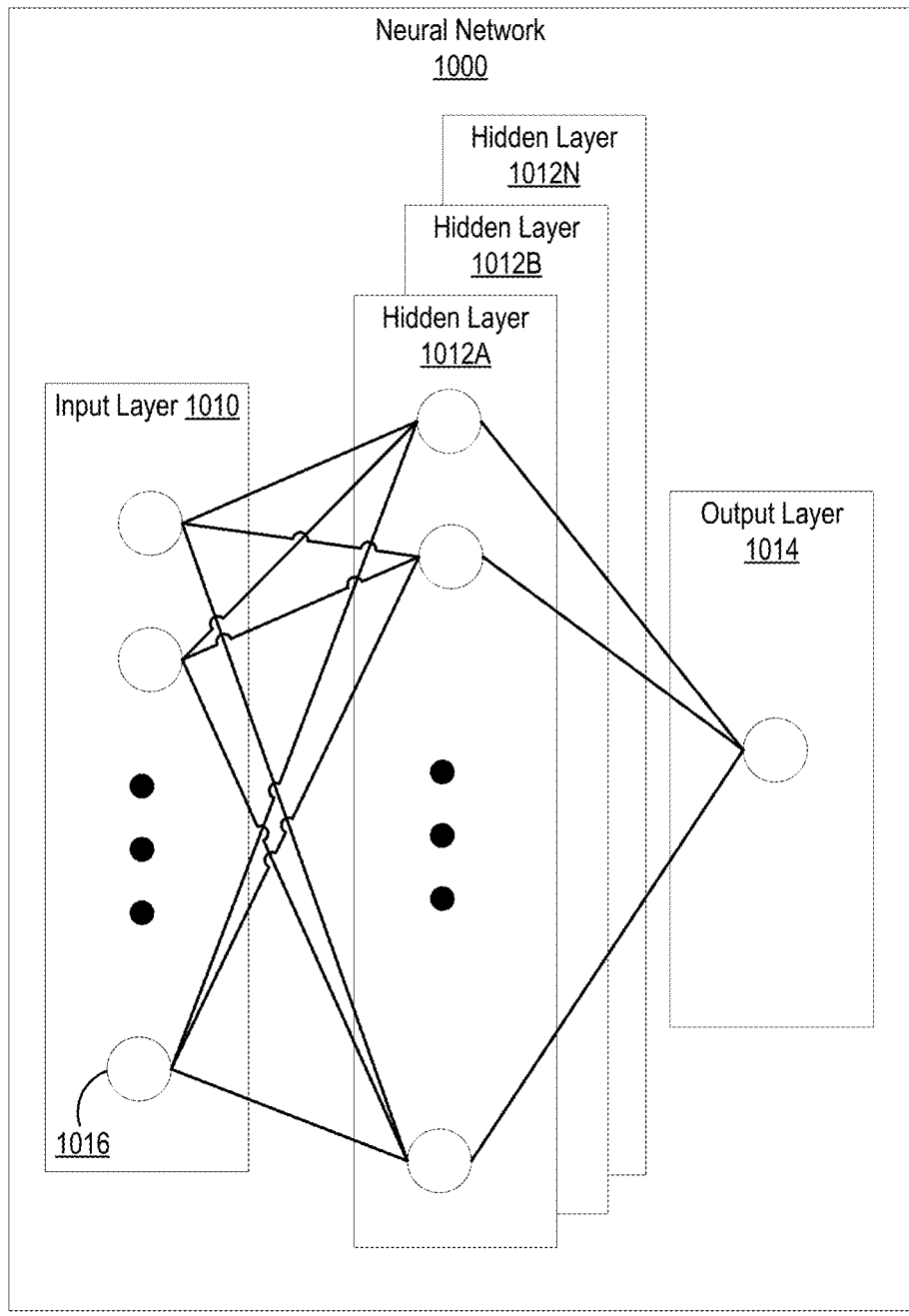
FIG. 10 is a block diagram illustrating an example of a neural network that can be used by the trained machine learning system for image processing, in accordance with some examples.

FIG. 10 is a block diagram illustrating an example of a neural network (NN) 1000 that can be used by the trained machine learning system for image processing. The neural network 1000 can include any type of deep network, such as a convolutional neural network (CNN), an autoencoder, a deep belief net (DBN), a Recurrent Neural Network (RNN), a Generative Adversarial Networks (GAN), and/or other type of neural network. The neural network 1000 may be an example of the image combination engine 225, the reconstruction engine 255, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the discriminator 550, the image synthesis engine 615, the one or more trained machine learning (ML) models of operation 1115, a NN running on the computing system 1200, a portion (e.g., component, element, and/or subroutine) of any of the listed systems, or a combination thereof.

An input layer 1010 of the neural network 1000 includes input data. The input data of the input layer 1010 can include data representing the pixels of one or more input image frames. In some examples, the input data of the input layer 1010 includes data representing the pixels of image data and/or metadata corresponding to the image data. In some examples, the input data of the input layer 1010 includes one or more images captured by the image capture and processing system 100, the image capture device 105A, the image processing device 105B, the image sensor 130, the sensor(s) 205, one or more other sensors described herein, or a combination thereof. Examples of the input data of the input layer 1010 include one or more images captured using at least a portion of the image capture and processing system 100, at least one of the source images 280, the identity image(s) 210, the attribute image(s) 215, the expression image(s) 220, the combined image(s) 230, at least one of the reconstructed images 285, the reconstructed identity image(s) 260, the reconstructed attribute image(s) 265, the reconstructed expression image(s) 270, the attribute image $I_{att}$ 305, the identity image $I_{id}$ 310, the expression image $I_{exp}$ 315, one or more other images $I_{x_i}$ 335, the combined image Y 380, the attribute image $I_{att}$ 505, at least one of the images $I_{x_i}$ 510 through $I_{x_m}$ 515, the combined image $Y_{ac}$ 525, the reconstructed image $Y_a$ 530, the attribute image $I_{att}$ 605, the identity image $I_{id}$ 610, the combined image $Y_{ac}$ 620, the combined image $Y_{ca}$ 625, the reconstructed image $Y_{acca}$ 630, the reconstructed image $Y_{caac}$ 635, the reconstructed image $Y_a$ 640, the identity image $I_{id}$ 705, the attribute image $I_{att}$ 710, the combined image Y 715, the combined image based on cycle reconstruction training $Y_r$ 720, the identity image $I_{id}$ 805, the attribute image $I_{att}$ 810, the combined image Y 815, the combined image based on cycle reconstruction training $Y_r$ 820, the identity image $I_{id}$ 905, the expression image $I_{exp}$ 910, the attribute image $I_{att}$ 915, the combined image Y 920, the identity image received in operation 1105, the attribute image received in operation 1110, the combined image generated in operation 1115 and output in operation 1120, another image described herein, or a combination thereof. In some examples, the input data of the input layer 1010 can include intermediate values or elements, such as tensors and/or features (e.g., input tensor $h_{in}^k$ 420, attribute feature tensor $z_{att}^k(I_{att})$ 405, identity feature tensor $z_{id}(I_{id})$ 435, expression feature tensor $z_{exp}(I_{exp})$ 450, output tensor $h_{out}^k$ 470, other tensors described or illustrated herein, other features described or illustrated herein, or a combination thereof.

The images can include image data from an image sensor including raw pixel data (including a single color per pixel based, for example, on a Bayer filter) or processed pixel values (e.g., RGB pixels of an RGB image). The neural network 1000 includes multiple hidden layers 1012A, 1012B, through 1012N. The hidden layers 1012A, 1012B, through 1012N include "N" number of hidden layers, where "N" is an integer greater than or equal to one. The number of hidden layers can be made to include as many layers as needed for the given application. The neural network 1000 further includes an output layer 1014 that provides an output resulting from the processing performed by the hidden layers 1012A, 1012B, through 1012N.

In some examples, the output layer 1014 can provide an output image. Examples of the output image include the combined image(s) 230, at least one of the reconstructed images 285, the reconstructed identity image(s) 260, the reconstructed attribute image(s) 265, the reconstructed expression image(s) 270, the combined image Y 380, the combined image $Y_{ac}$ 525, the reconstructed image $Y_a$ 530, the combined image $Y_{ac}$ 620, the combined image $Y_{ca}$ 625, the reconstructed image $Y_{acca}$ 630, the reconstructed image $Y_{caac}$ 635, the reconstructed image $Y_a$ 640, the combined image Y 715, the combined image based on cycle reconstruction training $Y_r$ 720, the combined image Y 815, the combined image based on cycle reconstruction training $Y_r$ 820, the combined image Y 920, the combined image generated in operation 1115 and output in operation 1120, another combined image described herein, another reconstructed image described herein, another generated image described herein, another image described herein, or a combination thereof. In some examples, the output layer 1014 can provide an intermediate values or elements, such as tensors and/or features (e.g., input tensor $Y_{in}^k$ 420, attribute feature tensor $z_{att}^k(I_{att})$ 405, identity feature tensor $z_{id}(I_{id})$ 435, expression feature tensor $z_{exp}(I_{exp})$ 450, output tensor $h_{out}^k$ 470, other tensors described or illustrated herein, other features described or illustrated herein, or a combination thereof. In some examples, the output layer 1014 can provide a determination (e.g., for the discriminator 550) as to whether an input image (e.g., combined image $Y_{ac}$ 525) depicts a real person, or whether the input image is synthesized or fake.

The neural network 1000 is a multi-layer neural network of interconnected filters. Each filter can be trained to learn a feature representative of the input data. Information associated with the filters is shared among the different layers and each layer retains information as information is processed. In some cases, the neural network 1000 can include a feed-forward network, in which case there are no feedback connections where outputs of the network are fed back into itself. In some cases, the network 1000 can include a recurrent neural network, which can have loops that allow information to be carried across nodes while reading in input.

In some cases, information can be exchanged between the layers through node-to-node interconnections between the various layers. In some cases, the network can include a convolutional neural network, which may not link every node in one layer to every other node in the next layer. In networks where information is exchanged between layers, nodes of the input layer 1010 can activate a set of nodes in the first hidden layer 1012A. For example, as shown, each of the input nodes of the input layer 1010 can be connected to each of the nodes of the first hidden layer 1012A. The nodes of a hidden layer can transform the information of each input node by applying activation functions (e.g., filters) to this information. The information derived from the transformation can then be passed to and can activate the nodes of the next hidden layer 1012B, which can perform their own designated functions. Example functions include convolutional functions, downscaling, upscaling, data transformation, and/or any other suitable functions. The output of the hidden layer 1012B can then activate nodes of the next hidden layer, and so on. The output of the last hidden layer 1012N can activate one or more nodes of the output layer 1014, which provides a processed output image. In some cases, while nodes (e.g., node 1016) in the neural network 1000 are shown as having multiple output lines, a node has a single output and all lines shown as being output from a node represent the same output value.

In some cases, each node or interconnection between nodes can have a weight that is a set of parameters derived from the training of the neural network 1000. For example, an interconnection between nodes can represent a piece of information learned about the interconnected nodes. The interconnection can have a tunable numeric weight that can be tuned (e.g., based on a training dataset), allowing the neural network 1000 to be adaptive to inputs and able to learn as more and more data is processed.

The neural network 1000 is pre-trained to process the features from the data in the input layer 1010 using the different hidden layers 1012A, 1012B, through 1012N in order to provide the output through the output layer 1014.

Figure 11:
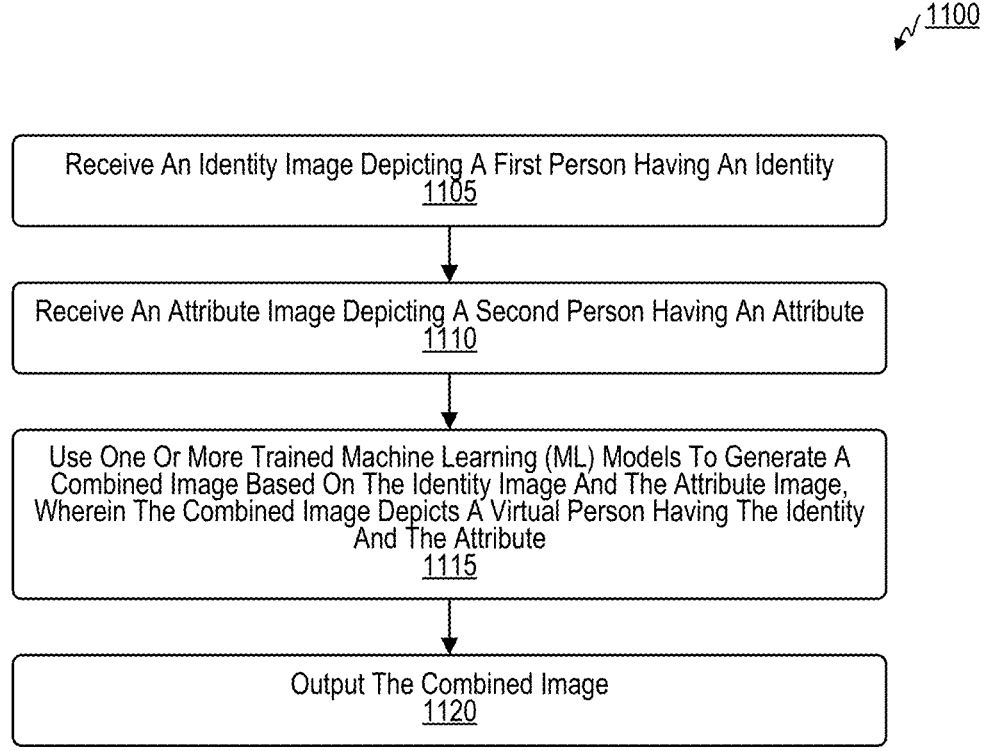
FIG. 11 is a flow diagram illustrating a process for image processing, in accordance with some examples.

FIG. 11 is a flow diagram illustrating a process 1100 for image processing. The process 1100 may be performed by an imaging system. In some examples, the imaging system can include, for example, the image capture and processing system 100, the image capture device 105A, the image processing device 105B, the image processor 150, the ISP 154, the host processor 152, the imaging system 200, the imaging system 250, the image combination engine 225, the reconstruction engine 255, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the discriminator 550, the image synthesis engine 615, the neural network 1000, the computing system 1200, the processor 1210, a portion (e.g., component, element, and/or subroutine) of any of the listed systems, another system described herein, or a combination thereof.

At operation 1105, the imaging system is configured to, and can, receive an identity image depicting a first person having an identity. At operation 1110, the imaging system is configured to, and can, receive an attribute image depicting a second person having an attribute. Examples of the identity image of operation 1105, and/or of the attribute image of operation 1110, include one or more images captured by the image capture and processing system 100, the image capture device 105A, the image processing device 105B, the image sensor 130, the sensor(s) 205, the input device 1245, one or more other sensors described herein, or a combination thereof. Examples of the identity image of operation 1105, and/or of the attribute image of operation 1110, include at least one of the source images 280, the identity image(s) 210, the attribute image(s) 215, the expression image(s) 220, the attribute image $I_{att}$ 305, the identity image $I_{id}$ 310, the expression image $I_{exp}$ 315, one or more other images $I_{x_i}$ 335, the attribute image $I_{att}$ 505, at least one of the images $I_{x_1}$ 510 through $I_{x_m}$ 515, the attribute image $I_{att}$ 605, the identity image $I_{id}$ 610, the combined image $Y_{ac}$ 620, the identity image $I_{id}$ 705, the attribute image $I_{att}$ 710, the identity image $I_{id}$ 805, the attribute image $I_{att}$ 810, the identity image $I_{id}$ 905, the expression image $I_{exp}$ 910, the attribute image $I_{att}$ 915, image data received via the input layer 1010 of the neural network 1000, another image described herein, or a combination thereof. In some examples, the first person is distinct from the second person. In some examples, the first person and the second person are the same person (e.g., share the same identity), but the person's appearance may nonetheless differ in one or more attributes between the identity image and the attribute image (e.g., the person's hairstyle may differ between the images, whether the person has facial hair may differ between image, whether the person is wearing glasses and/or other accessories may differ between the images, the person's facial expression may differ between the images, and the like).

In some examples, the attribute is of an attribute category, and the virtual person in the combined image also includes the attribute of the attribute category. The attribute category includes at least one of a facial feature, a characteristic of a facial feature, a worn accessory, a hairstyle, an age, a head pose, a body pose, a facial expression, a gender, a sex, or a combination thereof. For instance, in some examples, the attribute includes a facial feature of a face of the second person (and/or a characteristic thereof) as depicted in the attribute image, and a face of the virtual person in the combined image also includes the facial feature (and/or the characteristic thereof). Examples of such attributes that include one or more facial features and/or characteristics thereof include the eye attribute example 725, the mouth attribute example 745, the hair/expression attribute example 750, the hair/expression attribute example 760, the eye attribute example 765, the eye/expression attribute example 825, the eye/expression attribute example 830, the eye/expression attribute example 835, the eye attribute example 840, the mouth attribute example 845, the mouth attribute example 850, the eye attribute example 855, and the forehead attribute example 865, and the examples 925-955 of FIG. 9. In some examples, the attribute includes an accessory worn by the second person as depicted in the attribute image, and the virtual person in the combined image also wears the accessory. Examples of such attributes that include one or more accessories include the glasses attribute example 730 (where glasses are worn in the combined image based on cycle reconstruction training $Y_r$ 720 because they are worn in the attribute image $I_{att}$ 710) the hair attribute example 740 (e.g., where glasses are worn in the identity image $I_{id}$ 705 but are not worn in the attribute image $I_{att}$ 710 and therefore not worn in the combined image Y 715 and in the combined image based on cycle reconstruction training $Y_r$ 720), and the glasses attribute example 755 (where glasses are worn in the combined image based on cycle reconstruction training $Y_r$ 720 because they are worn in the attribute image $I_{att}$ 710).

In some examples, the attribute includes a style of hair of the second person as depicted in the attribute image, and hair of the virtual person in the combined image also has the style. Examples of such attributes that include one or more hairstyles include the hair attribute example 735, the hair/expression attribute example 750, the hair/expression attribute example 760, and the hair attribute example 860. In some examples, the attribute includes an age of the second person as depicted in the attribute image, and the virtual person in the combined image also has the age. In some examples, the attribute includes a gender and/or sex of the second person as depicted in the attribute image, and the virtual person in the combined image also has the gender and/or sex. In some examples, the attribute includes a skin tone of the second person as depicted in the attribute image, and the virtual person in the combined image also has the skin tone. In some examples, the attribute includes an eye color of the second person as depicted in the attribute image, and the virtual person in the combined image also has the eye color. In some examples, the attribute includes a background behind the second person as depicted in the attribute image, and the virtual person in the combined image also has the same background behind them. In some examples, the attribute includes an environmental illumination of the second person as depicted in the attribute image, and the virtual person in the combined image also has the environmental illumination. In some examples, the attribute includes a pose of a head of the second person as depicted in the attribute image, and a head of the virtual person in the combined image also has the pose. Examples of such attributes that include one or more head poses include all of the examples of FIG. 7, all of the examples of FIG. 8, and all of the examples of FIG. 9. For instance, the head poses of the virtual people in all of the combined images Y and/or $Y_r$ of FIGS. 7-9 match the head poses of the respective of attribute images $I_{att}$ of those figures.

In some examples, the attribute includes a pose of a body of the second person as depicted in the attribute image, and a body of the virtual person in the combined image also has the pose. Examples of such attributes that include one or more body poses include the eye attribute example 725, the glasses attribute example 730, the hair attribute example 740, the mouth attribute example 745, the glasses attribute example 755, the eye/expression attribute example 825, the eye attribute example 840, the hair attribute example 860, and some of the combinations of FIG. 9. In each of these examples, some portion of the body other than the head (e.g., the shoulders and/or torso) is at least partially visible in the combined images Y and/or $Y_r$, and is posed in way that matches a body pose in the respective attribute image $I_{att}$. In some examples, the attribute includes an expression of a face the second person as depicted in the attribute image, and the face of the virtual person in the combined image also has the expression. Examples of such attributes that include one or more head poses include the eye attribute example 725, the mouth attribute example 745, the hair/expression attribute example 750, the hair/expression attribute example 760, the eye attribute example 765, the eye/expression attribute example 825, the eye/expression attribute example 830, the eye/expression attribute example 835, the eye attribute example 840, the mouth attribute example 845, the mouth attribute example 850, the eye attribute example 855, and the forehead attribute example 865.

At operation 1115, the imaging system is configured to, and can, use one or more trained machine learning (ML) models to generate a combined image based on the identity image and the attribute image, wherein the combined image depicts a virtual person having the identity and the attribute.

Examples of the one or more trained ML models of operation 1115 include any type of ML system and/or ML model, such as a deep network, a convolutional neural network (CNN), an autoencoder, a deep belief net (DBN), a Recurrent Neural Network (RNN), a Generative Adversarial Networks (GAN), and/or other type of neural network. Examples of the one or more trained ML models of operation 1115 include the image combination engine 225, the reconstruction engine 255, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the image synthesis engine 615, the neural network 1000, a ML model running on the computing system 1200, a portion (e.g., component, element, and/or subroutine) of any of the listed systems, or a combination thereof.

Examples of the combined image of operation 1115 include the combined image(s) 230, the combined image Y 380, the combined image $Y_{ac}$ 525, the combined image $Y_{ac}$ 620, the combined image $Y_{ca}$ 625, the combined image Y 715, the combined image based on cycle reconstruction training $Y_r$ 720, the combined image Y 815, the combined image based on cycle reconstruction training $Y_r$ 820, the combined image Y 920, the combined image generated in operation 1115 and output in operation 1120, another combined image described herein, another generated image described herein, another image described herein, or a combination thereof.

In some examples, the imaging system is configured to, and can, receive an expression image depicting a third person having an expression. In such examples, the combined image can depict the virtual person having the identity and the attribute and the expression. In some examples, the third person is distinct from the first person and the second person. In some examples, the third person may be the same person (e.g., share the same identity) as the first person and/or the second person, but the person's appearance may nonetheless differ in one or more attributes between expression image and one or both of the other two images (the identity image and the attribute image). For instance, the person's expression may be different in the expression image than in at least one of the other two images.

In some examples, the imaging system is configured to, and can, receive a second attribute image depicting a third person having a second attribute. In such examples, the combined image depicts the virtual person having the identity and the attribute and the second attribute. In some aspects, the second attribute is distinct from the attribute. In some examples, the third person is distinct from the first person and the second person. In some examples, the third person may be the same person (e.g., share the same identity) as the first person and/or the second person, but the person's appearance may nonetheless differ in one or more attributes between second attribute image and one or both of the other two images (the identity image and the attribute image). For instance, in the second attribute image, one or more of the person's attributes (e.g., the person's hairstyle, whether the person has facial hair, whether the person is wearing glasses and/or other accessories, the person's facial expression, and the like) may be different than in at least one of the other two images.

In some aspects, the imaging system is configured to, and can, extract one or more identity features (e.g., $z_{id}$ 340, $z_{id}$ 435, identity feature tensor $z_{id}(I_{id})$ 435, identity feature $I^k$) from the identity image using one or more identity encoders (e.g., identity encoder $z_{id}(\cdot)$ 320) and/or extract one or more attribute features (e.g., $z_{att}^k(I_{att})$, $z_{att}^1(I_{att})$ 362, $z_{att}^2(I_{att})$ 367, $z_{att}^{n-1}(I_{att})$ 372, $z_{att}^n(I_{att})$ 377, $z_{xi}$ 355, attribute feature tensor $z_{att}^k(I_{att})$ 405, attribute feature $A^k$) from the identity image using one or more attribute encoders (e.g., e.g., multi-level attribute encoder $z_{att}(\cdot)$ 390, expression encoder $z_{exp}(\cdot)$ 325, encoder $z_{xi}(\cdot)$ 350). Generating the combined image (e.g., combined image Y 380) can include using the one or more identity features and/or the one or more attribute features as inputs to the one or more trained machine learning (ML) models.

In some aspects, the imaging system is configured to, and can, extract one or more identity features (e.g., $z_{id}$ 340, $z_{id}$ 435, identity feature tensor $z_{id}(I_{id})$ 435, identity feature $I^k$) from the identity image using one or more identity encoders (e.g., identity encoder $z_{id}(\cdot)$ 320), extract one or more attribute features (e.g., $z_{att}^k(I_{att})$, $z_{att}^1(I_{att})$ 362, $z_{att}^2(I_{att})$ 367, $z_{att}^{n-1}(I_{att})$ 372, $z_{att}^n(I_{att})$ 377, $z_{xi}$ 355, attribute feature tensor $z_{att}^k(I_{att})$ 405, attribute feature $A^k$) from the identity image using one or more attribute encoders (e.g., e.g., multi-level attribute encoder $z_{att}(\cdot)$ 390 and/or encoder $z_{xi}(\cdot)$ 350), and/or extract one or more expression features (e.g., $z_{exp}$ 345, $z_{exp}$ 450, expression feature tensor $z_{exp}(I_{exp})$ 450, expression feature $E^k$) using one or more expression encoders (e.g., expression encoder $z_{exp}(\cdot)$ 325). Generating the combined image (e.g., combined image Y 380) can include using the one or more identity features, the one or more attribute features, and/or the one or more expression features as inputs to the one or more trained machine learning (ML) models.

In some aspects, generating the combined image includes using one or more multi-channel adaptive attentional denormalization (MC-AAD) layers to adjust one or more regions of a face based on at least one of based on one or more features from at least one of the identity image and/or the attribute image and/or the expression image. In some aspects, the one or more MC-AAD layers include the one or more trained machine learning (ML) models. In some aspects, the one or more trained machine learning (ML) models include the one or more MC-AAD layers. Examples of the one or more MC-AAD layers include the MC-AAD layer 490 of FIG. 4, the MC-AAD layer(s) of the MC-AAD residual block 360, the MC-AAD layer(s) of the MC-AAD residual block 365, the MC-AAD layer(s) of the MC-AAD residual block 370, and/or the MC-AAD layer(s) of the MC-AAD residual block 375.

In some examples, generating the combined image includes modifying the attribute image to incorporate the identity from the identity image and/or the expression from the expression image. For instance, in FIG. 3, identity features $z_{id}$ 340 and/or expression features $z_{exp}$ 345 and/or features $z_{xi}$ 355 are used by the multi-level attribute encoder $z_{att}(\cdot)$ 390 and/or the generator G($\cdot$) 395 to modify aspects of the attribute image $I_{att}$ 305 (e.g., attribute features $z_{att}^k(I_{att})$, $z_{att}^1(I_{att})$ 362, $z_{att}^2(I_{att})$ 367, $z_{att}^{n-1}(I_{att})$ 372, and/or $z_{att}^n(I_{att})$ 377) to generate the combined image Y 380. In some examples, generating the combined image includes modifying the identity image to incorporate the attribute from the attribute image and/or the expression from the expression image. In some examples, generating the combined image includes modifying the expression image to incorporate the attribute from the attribute image and/or the identity from the identity image.

In some examples, generating the combined image includes denormalizing the identity and/or the attribute and/or the expression using the one or more trained ML models. In some examples, generating the combined image includes denormalizing and renormalizing the identity and/or the attribute and/or the expression using the one or more trained ML models. Examples of such denormalization includes the denormalization of the input tensor $h_{in}^k$ 420 to produce the denormalized input tensor $\bar{h}^k$ 425 by the MC-AAD layer 490, for instance based on the calculation $\bar{h}^k=(h_{in}^k-\mu^k)/\sigma^k$, as illustrated in FIG. 4. Examples of such renomalization includes the renormalization of the denormalized input tensor $\bar{h}^k$ 425 by the MC-AAD layer 490 by multiplying the denormalized input tensor $\bar{h}^k$ 425 by the feature map $\gamma_{att}^k$ 415, adding the feature map $\rho_{att}^k$ 410 to the product, and integrating the result with at least one of the attribute feature tensor $z_{att}^k(I_{att})$ 405, the identity feature tensor $z_{id}(I_{id})$ 435, and/or the expression feature tensor $z_{exp}(I_{exp})$ 450, to produce to produce attribute feature $A^k$, identity feature $I^k$, and/or expression feature $E^k$, as illustrated in FIG. 4.

In some examples, generating the combined image includes minimizing classification of the combined image as synthesized by a discriminator that is configured to determine whether an input to the discriminator is synthesized or depicts a real person. An example of the discriminator includes the discriminator 550 of FIG. 5A. In an illustrative example, the imaging system may train the image synthesis engine 520 to maximize classification error $\mathcal{L}_{DIS}$ to fool the discriminator 550 into classifying the combined image $Y_{ac}$ 525 as real instead of classifying the combined image $Y_{ac}$ 525 as synthesized or fake, as discussed with respect to FIG. 5A.

In some examples, the imaging system is configured to, and can, train a second set of one or more ML models based on the combined image. The second set of one or more ML models is associated with a discriminator. An example of the discriminator includes the discriminator 550 of FIG. 5A. Training the second set of one or more ML models trains the discriminator to classify the combined image as synthesized (e.g., train the image synthesis engine 520 to minimize the classification error $\mathcal{L}_{DIS}$ so that the discriminator 550 correctly classifies the combined image $Y_{ac}$ 525 as synthesized or fake, as discussed with respect to FIG. 5A). In some aspects, the imaging system is configured to, and can, train the one or more ML models to generate the combined image so that the discriminator classifies the combined image as depicting a real person (e.g., to maximize classification error $\mathcal{L}_{DIS}$ to fool the discriminator 550 into classifying the combined image $Y_{ac}$ 525 as real instead of classifying the combined image $Y_{ac}$ 525 as synthesized or fake, as discussed with respect to FIG. 5A).

In some examples, the one or more trained machine learning (ML) models are trained using a cycle-consistency process in which the one or more trained machine learning (ML) models reconstruct one or more source images from one or more previously-combined images previously generated using the one or more trained machine learning (ML) models. The cycle-consistency process may be referred to herein as a cycle reconstruction process, a cycle consistency process, or a combination thereof. The previously-combined images in these examples may refer, for instance, to the combined image $Y_{ac}$ 620 and/or the combined image $Y_{ca}$ 625 of FIG. 6A. The one or more source images in these examples may refer, for instance, to the attribute image $I_{att}$ 605 and/or the identity image $I_{id}$ 610 of FIG. 6A. The combined image the reconstructs the one or more source images, in these examples, may refer to the reconstructed image $Y_{acca}$ 630 and/or the reconstructed image $Y_{caac}$ 635 of FIG. 6A.

In some examples, the imaging system is configured to, and can, use the one or more trained ML models to generate at least one of a reconstructed identity image and/or a reconstructed attribute image and/or a reconstructed expression image based on the combined image. In these examples, the combined image may include, for example, the combined image $Y_{ac}$ 620 and/or the combined image $Y_{ca}$ 625 of FIG. 6A. The reconstructed identity image is a reconstruction of the identity image based on the combined image. An example of the reconstructed identity image is the reconstructed image $Y_{caac}$ 635 of FIG. 6A, which is a reconstruction of the identity image $I_{id}$ 610 of FIG. 6A. The reconstructed attribute image is a reconstruction of the attribute image based on the combined image. An example of the reconstructed attribute image is the reconstructed image $Y_{acca}$ 630 of FIG. 6A, which is a reconstruction of the attribute image $I_{att}$ 605 of FIG. 6A. The reconstructed expression image is a reconstruction of the expression image based on the combined image. In some aspects, the imaging system is configured to, and can, update the one or more trained ML models based on a first comparison between the identity image and the reconstructed identity image and based on a second comparison between the attribute image and the reconstructed attribute image. For example, the image synthesis engine 615 may be trained further based on the reconstructed image $Y_{acca}$ 630 and/or the reconstructed image $Y_{caac}$ 635 of FIG. 6A. For instance, the image synthesis engine 615 may be trained further to minimize difference(s) between the reconstructed image $Y_{acca}$ 630 and the attribute image $I_{att}$ 605, and/or to minimize difference(s) between the reconstructed image $Y_{caac}$ 635 and the identity image $I_{id}$ 610.

In some examples, generating the combined image includes generating a combined video. For instance, the combined image can be a video frame of the combined video. To produce a combined video, the attribute image $I_{att}$, the identity image $I_{id}$, and/or the expression image $I_{exp}$ can be a frame from a respective input video. In some examples, one or more of these source images is from a video, while one or more of these source images is from a still image. In an illustrative example, the identity image $I_{id}$ can be a still image to ensure the identity looks as consistent as possible in the combined video, while the attribute image(s) $I_{att}$ and/or the expression image(s) $I_{exp}$ used to create the combined video can be frames from source video(s) to ensure that expressions and/or other attributes are updated fluidly.

At operation 1120, the imaging system is configured to, and can, output the combined image. In some examples, the imaging system is configured to output the combined image at least in part by sending the combined image to a recipient device (e.g., using a transceiver and/or the communication interface 1240). In some examples, the imaging system includes the transceiver. In some examples, the imaging system is configured to output the combined image at least in part by causing the combined image to be displayed using a display (e.g., and/or an output device 1235). In some examples, the imaging system includes the display (e.g., and/or an output device 1235).

In some examples, the imaging system is configured to, and can, use the one or more trained ML models to generate a reconstructed identity image and/or a reconstructed attribute image based on the combined image. The reconstructed identity image is a reconstruction of the identity image based on the combined image. The reconstructed attribute image is a reconstruction of the attribute image based on the combined image. Examples of the reconstructed images include at least one of the reconstructed images 285, the reconstructed identity image(s) 260, the reconstructed attribute image(s) 265, the reconstructed expression image(s) 270, the reconstructed image $Y_a$ 530, the reconstructed image $Y_{acca}$ 630, the reconstructed image $Y_{caac}$ 635, the reconstructed image $Y_a$ 640, another reconstructed image described herein, another image described herein, or a combination thereof.

In some examples, the imaging system is configured to, and can, update the one or more trained ML models based on a first comparison between the identity image and the reconstructed identity image and based on a second comparison between the attribute image and the reconstructed attribute image.

In some examples, the imaging system can include: means for receiving an identity image depicting a first person having an identity; means for receiving an attribute image depicting a second person having an attribute; means for using one or more trained machine learning (ML) models to generate a combined image based on the identity image and the attribute image, wherein the combined image depicts a virtual person having the identity and the attribute; and means for outputting the combined image.

In some examples, the means for receiving the identity image and/or receiving the attribute image includes the image capture and processing system 100, the image capture device 105A, the image processing device 105B, the image sensor 130, the sensor(s) 205, the input device 1245, one or more other sensors described herein, or a combination thereof. In some examples, the means for using the one or more trained ML models to generate the combined image include the image capture and processing system 100, the image processing device 105B, the image processor 150, the ISP 154, the host processor 152, the imaging system 200, the imaging system 250, the image combination engine 225, the reconstruction engine 255, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the discriminator 550, the image synthesis engine 615, the neural network 1000, the computing system 1200, the processor 1210, a portion (e.g., component, element, and/or subroutine) of any of the listed systems, another system described herein, or a combination thereof. In some examples, the means for outputting the combined image include the output device 1235 and/or the communication interface 1240.

In some examples, the processes described herein (e.g., processes of FIGS. 1, 2A, 2B, 3, 4, 5A, 5B, 6A, 6B, 7, 8, 9, 10, 11, and/or other process described herein) may be performed by a computing device or apparatus. In some examples, the processes described herein can be performed by the image capture and processing system 100, the image capture device 105A, the image processing device 105B, the image processor 150, the ISP 154, the host processor 152, the imaging system 200, the imaging system 250, the image combination engine 225, the reconstruction engine 255, the comparison engine 290, the image synthesis engine 300, the multi-level attribute encoder $z_{att}(\cdot)$ 390, the generator 395, the identity encoder 320, the expression encoder 325, the encoder 350, the multi-channel adaptive attentional denormalization (MC-AAD) residual block 360, the MC-AAD residual block 365, the MC-AAD residual block 370, the MC-AAD residual block 375, the MC-AAD layer system 400, the MC-AAD layer 490, the image synthesis engine 520, the discriminator 550, the image synthesis engine 615, the neural network 1000, the imaging system of FIG. 11, the computing system 1200, the processor 1210, a portion (e.g., component, element, and/or subroutine) of any of the listed systems, another system described herein, or a combination thereof.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, an autonomous vehicle or computing device of an autonomous vehicle, a robotic device, a television, and/or any other computing device with the resource capabilities to perform the processes described herein, including the processes of FIGS. 1, 2, 8, 9, and/or 10. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The processes described herein are illustrated as logical flow diagrams, block diagrams, or conceptual diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the processes described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 12:
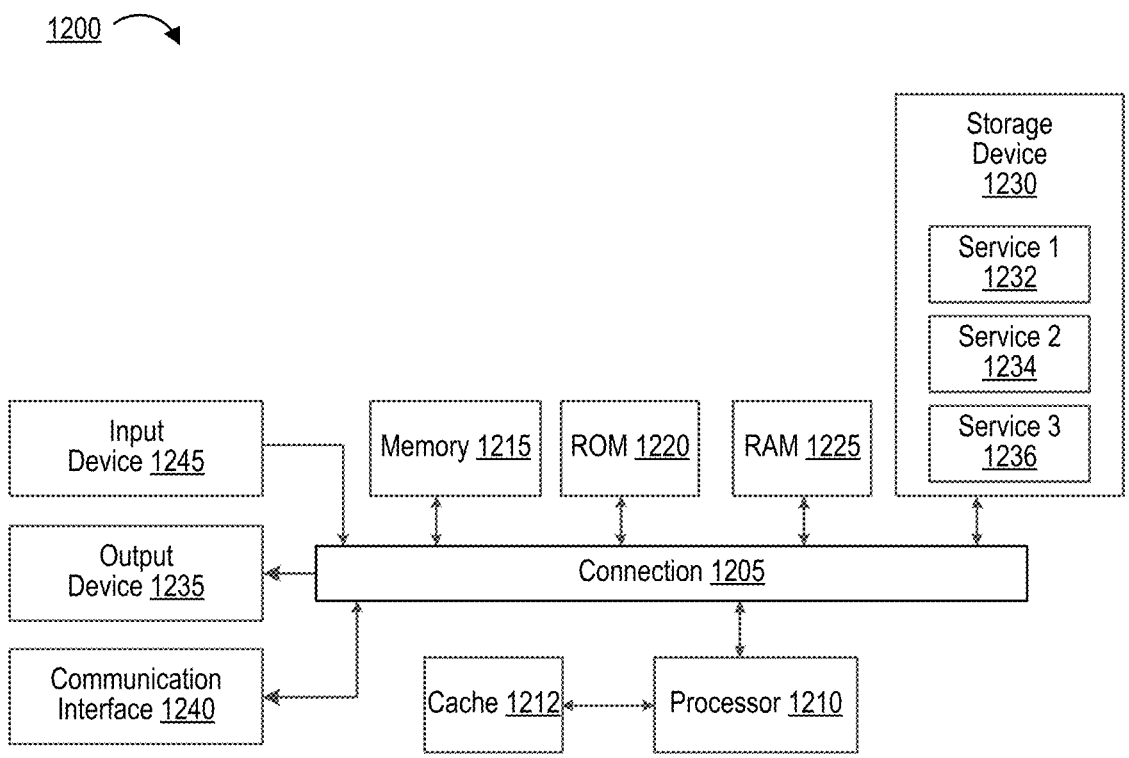
FIG. 12 is a diagram illustrating an example of a computing system for implementing certain aspects described herein.

FIG. 12 is a diagram illustrating an example of a system for implementing certain aspects of the present technology. In particular, FIG. 12 illustrates an example of computing system 1200, which can be for example any computing device making up internal computing system, a remote computing system, a camera, or any component thereof in which the components of the system are in communication with each other using connection 1205. Connection 1205 can be a physical connection using a bus, or a direct connection into processor 1210, such as in a chipset architecture. Connection 1205 can also be a virtual connection, networked connection, or logical connection.

In some embodiments, computing system 1200 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 1200 includes at least one processing unit (CPU or processor) 1210 and connection 1205 that couples various system components including system memory 1215, such as read-only memory (ROM) 1220 and random access memory (RAM) 1225 to processor 1210. Computing system 1200 can include a cache 1212 of high-speed memory connected directly with, in close proximity to, or integrated as part of processor 1210.

Processor 1210 can include any general purpose processor and a hardware service or software service, such as services 1232, 1234, and 1236 stored in storage device 1230, configured to control processor 1210 as well as a special-purpose processor where software instructions are incorporated into the actual processor design. Processor 1210 may essentially be a completely self-contained computing system, containing multiple cores or processors, a bus, memory controller, cache, etc. A multi-core processor may be symmetric or asymmetric.

To enable user interaction, computing system 1200 includes an input device 1245, which can represent any number of input mechanisms, such as a microphone for speech, a touch-sensitive screen for gesture or graphical input, keyboard, mouse, motion input, speech, etc. Computing system 1200 can also include output device 1235, which can be one or more of a number of output mechanisms. In some instances, multimodal systems can enable a user to provide multiple types of input/output to communicate with computing system 1200. Computing system 1200 can include communications interface 1240, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 1240 may also include one or more Global Navigation Satellite System (GNSS) receivers or transceivers that are used to determine a location of the computing system 1200 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1230 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/l2/l3/l4/l5/L #), resistive random-access memory (RRAM/ReRAM), phase change memory (PCM), spin transfer torque RAM (STT-RAM), another memory chip or cartridge, and/or a combination thereof.

The storage device 1230 can include software services, servers, services, etc., that when the code that defines such software is executed by the processor 1210, it causes the system to perform a function. In some embodiments, a hardware service that performs a particular function can include the software component stored in a computer-readable medium in connection with the necessary hardware components, such as processor 1210, connection 1205, output device 1235, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1: An extended reality (XR) system, the apparatus comprising: a memory; and one or more processors coupled to the memory, the one or more processors configured to: receive an identity image depicting a first person having an identity; receive an attribute image depicting a second person having an attribute; use one or more trained machine learning (ML) models to generate a combined image based on the identity image and the attribute image, wherein the combined image depicts a virtual person having the identity and the attribute; and output the combined image.

Aspect 2. The apparatus of Aspect 1, wherein the first person is distinct from the second person.

Aspect 3. The apparatus of any of Aspects 1 to 2, wherein the one or more processors are configured to: receive an expression image depicting a third person having an expression, wherein, to generate the combined image, the one or more processors are configured to use one or more trained ML models to generate the combined image based on the identity image and the attribute image and the expression image, wherein the combined image depicts the virtual person having the identity and the attribute and the expression.

Aspect 4. The apparatus of any of Aspects 1 to 3, wherein the third person is distinct from the first person and the second person.

Aspect 5. The apparatus of any of Aspects 1 to 4, wherein the one or more processors are configured to: receive a second attribute image depicting a third person having a second attribute, wherein, to generate the combined image, the one or more processors are configured to use one or more trained ML models to generate the combined image based on the identity image and the attribute image and the second attribute image, wherein the combined image depicts the virtual person having the identity and the attribute and the second attribute.

Aspect 6. The apparatus of any of Aspects 1 to 5, wherein the third person is distinct from the first person and the second person.

Aspect 7. The apparatus of any of Aspects 1 to 6, wherein the second attribute is distinct from the attribute.

Aspect 8. The apparatus of any of Aspects 1 to 7, wherein the attribute is of an attribute category, wherein the virtual person in the combined image also includes the attribute of the attribute category, wherein the attribute category includes at least one of a facial feature, a characteristic of a facial feature, a worn accessory, a hairstyle, an age, a head pose, a body pose, a facial expression, a gender, or a sex.

Aspect 9. The apparatus of any of Aspects 1 to 8, wherein the attribute includes a facial feature of a face of the second person as depicted in the attribute image, wherein a face of the virtual person in the combined image also includes the facial feature.

Aspect 10. The apparatus of any of Aspects 1 to 9, wherein the attribute includes a characteristic of a facial feature of a face of the second person as depicted in the attribute image, wherein a face of the virtual person in the combined image also includes the facial feature with the characteristic.

Aspect 11. The apparatus of any of Aspects 1 to 10, wherein the attribute includes an accessory worn by the second person as depicted in the attribute image, wherein the virtual person in the combined image also wears the accessory.

Aspect 12. The apparatus of any of Aspects 1 to 11, wherein the attribute includes a style of hair of the second person as depicted in the attribute image, wherein hair of the virtual person in the combined image also has the style.

Aspect 13. The apparatus of any of Aspects 1 to 12, wherein the attribute includes an age of the second person as depicted in the attribute image, wherein the virtual person in the combined image also has the age.

Aspect 14. The apparatus of any of Aspects 1 to 13, wherein the attribute includes a pose of a head of the second person as depicted in the attribute image, wherein a head of the virtual person in the combined image also has the pose.

Aspect 15. The apparatus of any of Aspects 1 to 14, wherein the attribute includes an expression of a face the second person as depicted in the attribute image, wherein the face of the virtual person in the combined image also has the expression.

Aspect 16. The apparatus of any of Aspects 1 to 15, wherein the one or more processors are configured to: extract one or more identity features from the identity image using one or more identity encoders; and extract one or more attribute features from the identity image using one or more attribute encoders, wherein, to generate the combined image, the one or more processors are configured to use the one or more identity features and the one or more attribute features as inputs to the one or more trained machine learning (ML) models.

Aspect 17. The apparatus of any of Aspects 1 to 16, wherein, to generate the combined image, the one or more processors are configured to use one or more multi-channel adaptive attentional denormalization (MC-AAD) layers to adjust one or more regions of a face based on at least one of based on one or more features from at least one of the identity image or the attribute image, wherein the one or more MC-AAD layers include the one or more trained machine learning (ML) models.

Aspect 18. The apparatus of any of Aspects 1 to 17, wherein, to generate the combined image, the one or more processors are configured to modify the identity image to incorporate the attribute from the attribute image.

Aspect 19. The apparatus of any of Aspects 1 to 18, wherein, to generate the combined image, the one or more processors are configured to modify the attribute image to incorporate the identity from the identity image.

Aspect 20. The apparatus of any of Aspects 1 to 19, wherein, to generate the combined image, the one or more processors are configured to denormalize the identity and the attribute using the one or more trained ML models.

Aspect 21. The apparatus of any of Aspects 1 to 20, wherein, to generate the combined image, the one or more processors are configured to denormalize and renormalize the identity and the attribute using the one or more trained ML models.

Aspect 22. The apparatus of any of Aspects 1 to 21, wherein, to generate the combined image, the one or more processors are configured to minimize classification of the combined image as synthesized by a discriminator that is configured to determine whether an input to the discriminator is synthesized or depicts a real person.

Aspect 23. The apparatus of any of Aspects 1 to 22, wherein the one or more trained machine learning (ML) models are trained using a cycle-consistency process in which the one or more trained machine learning (ML) models reconstruct one or more source images from one or more previously-combined images previously generated using the one or more trained machine learning (ML) models.

Aspect 24. The apparatus of any of Aspects 1 to 23, wherein the one or more processors are configured to: train a second set of one or more ML models based on the combined image, wherein the second set of one or more ML models is associated with a discriminator, wherein training the second set of one or more ML models trains the discriminator to classify the combined image as synthesized.

Aspect 25. The apparatus of any of Aspects 1 to 24, wherein the one or more processors are configured to: use the one or more trained ML models to generate at least one of a reconstructed identity image or a reconstructed attribute image based on the combined image, wherein the reconstructed identity image is a reconstruction of the identity image based on the combined image, wherein the reconstructed attribute image is a reconstruction of the attribute image based on the combined image.

Aspect 26. The apparatus of any of Aspects 1 to 25, wherein the one or more processors are configured to: train the one or more ML models to generate the combined image so that the discriminator classifies the combined image as depicting a real person.

Aspect 27. The apparatus of any of Aspects 1 to 26, wherein the one or more processors are configured to: update the one or more trained ML models based on a first comparison between the identity image and the reconstructed identity image and based on a second comparison between the attribute image and the reconstructed attribute image.

Aspect 28. The apparatus of any of Aspects 1 to 27, wherein, to generate the combined image, the one or more processors are configured to generate a combined video, wherein the combined image is a video frame of the combined video.

Aspect 29. The apparatus of any of Aspects 1 to 28, wherein, to output the combined image, the one or more processors are configured to send the combined image to a recipient device.

Aspect 30. The apparatus of any of Aspects 1 to 29, wherein, to output the combined image, the one or more processors are configured to cause the combined image to be displayed using a display.

Aspect 31. The apparatus of any of Aspects 1 to 30, wherein the apparatus includes at least one of a mobile handset, a wireless communication device, and a head-mounted display.

Aspect 32. A method of image processing, the method comprising: receiving an identity image depicting a first person having an identity; receiving an attribute image depicting a second person having an attribute; using one or more trained machine learning (ML) models to generate a combined image based on the identity image and the attribute image, wherein the combined image depicts a virtual person having the identity and the attribute; and outputting the combined image.

Aspect 33. The method of Aspect 32, wherein the first person is distinct from the second person.

Aspect 34. The method of any of Aspects 32 to 33, further comprising: receiving an expression image depicting a third person having an expression, wherein, generating the combined image includes using the one or more trained ML models to generate the combined image based on the identity image and the attribute image and the expression image, wherein the combined image depicts the virtual person having the identity and the attribute and the expression.

Aspect 35. The method of any of Aspects 32 to 34, wherein the third person is distinct from the first person and the second person.

Aspect 36. The method of any of Aspects 32 to 35, further comprising: receiving a second attribute image depicting a third person having a second attribute, wherein generating the combined image includes using the one or more trained ML models to generate the combined image based on the identity image and the attribute image and the second attribute image, wherein the combined image depicts the virtual person having the identity and the attribute and the second attribute.

Aspect 37. The method of any of Aspects 32 to 36, wherein the third person is distinct from the first person and the second person.

Aspect 38. The method of any of Aspects 32 to 37, wherein the second attribute is distinct from the attribute.

Aspect 39. The method of any of Aspects 32 to 38, wherein the attribute is of an attribute category, wherein the virtual person in the combined image also includes the attribute of the attribute category, wherein the attribute category includes at least one of a facial feature, a characteristic of a facial feature, a worn accessory, a hairstyle, an age, a head pose, a body pose, a facial expression, a gender, or a sex.

Aspect 40. The method of any of Aspects 32 to 39, wherein the attribute includes a facial feature of a face of the second person as depicted in the attribute image, wherein a face of the virtual person in the combined image also includes the facial feature.

Aspect 41. The method of any of Aspects 32 to 40, wherein the attribute includes a characteristic of a facial feature of a face of the second person as depicted in the attribute image, wherein a face of the virtual person in the combined image also includes the facial feature with the characteristic.

Aspect 42. The method of any of Aspects 32 to 41, wherein the attribute includes an accessory worn by the second person as depicted in the attribute image, wherein the virtual person in the combined image also wears the accessory.

Aspect 43. The method of any of Aspects 32 to 42, wherein the attribute includes a style of hair of the second person as depicted in the attribute image, wherein hair of the virtual person in the combined image also has the style.

Aspect 44. The method of any of Aspects 32 to 43, wherein the attribute includes an age of the second person as depicted in the attribute image, wherein the virtual person in the combined image also has the age.

Aspect 45. The method of any of Aspects 32 to 44, wherein the attribute includes a pose of a head of the second person as depicted in the attribute image, wherein a head of the virtual person in the combined image also has the pose.

Aspect 46. The method of any of Aspects 32 to 45, wherein the attribute includes an expression of a face the second person as depicted in the attribute image, wherein the face of the virtual person in the combined image also has the expression.

Aspect 47. The method of any of Aspects 32 to 46, further comprising: extracting one or more identity features from the identity image using one or more identity encoders; and extracting one or more attribute features from the identity image using one or more attribute encoders, wherein generating the combined image includes using the one or more identity features and the one or more attribute features as inputs to the one or more trained machine learning (ML) models.

Aspect 48. The method of any of Aspects 32 to 47, wherein generating the combined image includes using one or more multi-channel adaptive attentional denormalization (MC-AAD) layers to adjust one or more regions of a face based on at least one of based on one or more features from at least one of the identity image or the attribute image, wherein the one or more MC-AAD layers include the one or more trained machine learning (ML) models.

Aspect 49. The method of any of Aspects 32 to 48, wherein generating the combined image includes modifying the identity image to incorporate the attribute from the attribute image.

Aspect 50. The method of any of Aspects 32 to 49, wherein generating the combined image includes modifying the attribute image to incorporate the identity from the identity image.

Aspect 51. The method of any of Aspects 32 to 50, wherein generating the combined image includes denormalizing the identity and the attribute using the one or more trained ML models.

Aspect 52. The method of any of Aspects 32 to 51, wherein generating the combined image includes denormalizing and renormalizing the identity and the attribute using the one or more trained ML models.

Aspect 53. The method of any of Aspects 32 to 52, wherein generating the combined image includes minimizing classification of the combined image as synthesized by a discriminator that is configured to determine whether an input to the discriminator is synthesized or depicts a real person.

Aspect 54. The method of any of Aspects 32 to 53, wherein the one or more trained machine learning (ML) models are trained using a cycle-consistency process in which the one or more trained machine learning (ML) models reconstruct one or more source images from one or more previously-combined images previously generated using the one or more trained machine learning (ML) models.

Aspect 55. The method of any of Aspects 32 to 54, further comprising: training a second set of one or more ML models based on the combined image, wherein the second set of one or more ML models is associated with a discriminator, wherein training the second set of one or more ML models trains the discriminator to classify the combined image as synthesized.

Aspect 56. The method of any of Aspects 32 to 55, further comprising: training the one or more ML models to generate the combined image so that the discriminator classifies the combined image as depicting a real person.

Aspect 57. The method of any of Aspects 32 to 56, further comprising: using the one or more trained ML models to generate at least one of a reconstructed identity image or a reconstructed attribute image based on the combined image, wherein the reconstructed identity image is a reconstruction of the identity image based on the combined image, wherein the reconstructed attribute image is a reconstruction of the attribute image based on the combined image.

Aspect 58. The method of any of Aspects 32 to 57, further comprising: updating the one or more trained ML models based on a first comparison between the identity image and the reconstructed identity image and based on a second comparison between the attribute image and the reconstructed attribute image.

Aspect 59. The method of any of Aspects 32 to 58, wherein generating the combined image includes generating a combined video, wherein the combined image is a video frame of the combined video.

Aspect 60. The method of any of Aspects 32 to 59, wherein outputting the combined image sending the combined image to a recipient device.

Aspect 61. The method of any of Aspects 32 to 60, wherein outputting the combined image causing the combined image to be displayed using a display.

Aspect 62. The method of any of Aspects 32 to 61, wherein the method is performed using an apparatus that includes at least one of a mobile handset, a wireless communication device, and a head-mounted display.

Aspect 63: A non-transitory computer-readable medium having stored thereon instructions that, when executed by one or more processors, cause the one or more processors to: receive an identity image depicting a first person having an identity; receive an attribute image depicting a second person having an attribute; use one or more trained machine learning (ML) models to generate a combined image based on the identity image and the attribute image, wherein the combined image depicts a virtual person having the identity and the attribute; and output the combined image.

Aspect 64: The non-transitory computer-readable medium of Aspect 64, further comprising any of Aspects 2 to 31, and/or any of Aspects 33 to 62.

Aspect 65: An apparatus for image processing, the apparatus comprising: means for receiving an identity image depicting a first person having an identity; means for receiving an attribute image depicting a second person having an attribute; means for using one or more trained machine learning (ML) models to generate a combined image based on the identity image and the attribute image, wherein the combined image depicts a virtual person having the identity and the attribute; and means for outputting the combined image.

Aspect 66: The apparatus of Aspect 65, further comprising any of Aspects 2 to 31, and/or any of Aspects 33 to 62.

What is claimed is:

1. An apparatus for image processing, the apparatus comprising:
   at least one memory; and
   one or more processors coupled to the at least one memory, the one or more processors configured to:
   receive an identity image depicting a first person having an identity;
   receive an attribute image depicting a second person having an attribute;
   receive a third image depicting a third person having a feature;
   use one or more trained machine learning (ML) models to generate a combined image based on the identity image and the attribute image and the third image, wherein the combined image depicts a virtual person having the identity and the attribute and the feature; and
   output the combined image.

2. The apparatus of claim 1, wherein the first person is distinct from the second person.

3. The apparatus of claim 1, wherein the feature is an expression.

4. The apparatus of claim 1, wherein the third person is distinct from the first person and the second person.

5. The apparatus of claim 1, wherein the feature is a second attribute that is distinct from the attribute.

6. The apparatus of claim 1, wherein the attribute is of an attribute category, wherein the virtual person in the combined image also includes the attribute of the attribute category, wherein the attribute category includes at least one of a facial feature, a characteristic of a facial feature, a worn accessory, a hairstyle, an age, a head pose, a body pose, a facial expression, a gender, or a sex.

7. The apparatus of claim 1, wherein the one or more processors are configured to:
   extract one or more identity features from the identity image using one or more identity encoders; and
   extract one or more attribute features from the identity image using one or more attribute encoders, wherein, to generate the combined image, the one or more processors are configured to use the one or more identity features and the one or more attribute features as inputs to the one or more trained machine learning (ML) models.

8. The apparatus of claim 1, wherein, to generate the combined image, the one or more processors are configured to use one or more multi-channel adaptive attentional denormalization (MC-AAD) layers to adjust one or more regions of a face based on at least one of based on one or more features from at least one of the identity image or the attribute image, wherein the one or more MC-AAD layers are associated with the one or more trained machine learning (ML) models.

9. The apparatus of claim 1, wherein, to generate the combined image, the one or more processors are configured to modify the identity image to incorporate the attribute from the attribute image and the feature from the third image.

10. The apparatus of claim 1, wherein, to generate the combined image, the one or more processors are configured to modify the attribute image to incorporate the identity from the identity image and the feature from the third image.

11. The apparatus of claim 1, wherein, to generate the combined image, the one or more processors are configured to denormalize the identity, the attribute, and the feature using the one or more trained ML models.

12. The apparatus of claim 1, wherein, to generate the combined image, the one or more processors are configured to denormalize and renormalize the identity, the attribute, and the feature using the one or more trained ML models.

13. The apparatus of claim 1, wherein, to generate the combined image, the one or more processors are configured to minimize classification of the combined image as synthesized by a discriminator that is configured to determine whether an input to the discriminator is synthesized or depicts a real person.

14. The apparatus of claim 1, wherein the one or more trained machine learning (ML) models are trained using a cycle-consistency process in which the one or more trained machine learning (ML) models reconstruct one or more source images from one or more previously-combined images previously generated using the one or more trained machine learning (ML) models.

15. The apparatus of claim 1, wherein the one or more processors are configured to:
   train a second set of one or more ML models based on the combined image, wherein the second set of one or more ML models is associated with a discriminator, wherein training the second set of one or more ML models trains the discriminator to classify the combined image as synthesized.

16. The apparatus of claim 1, wherein the one or more processors are configured to:
   use the one or more trained ML models to generate, based on the combined image, at least one of a reconstructed identity image or a reconstructed attribute image or a reconstructed third image, wherein the reconstructed identity image is a reconstruction of the identity image based on the combined image, wherein the reconstructed attribute image is a reconstruction of the attribute image based on the combined image, wherein the reconstructed third image is a reconstruction of the third image based on the combined image.

17. The apparatus of claim 16, wherein the one or more processors are configured to:
   update the one or more trained ML models based on at least one of a first comparison between the identity image and the reconstructed identity image, a second comparison between the attribute image and the reconstructed attribute image, or a third comparison between the third image and the reconstructed third image.

18. The apparatus of claim 1, wherein, to generate the combined image, the one or more processors are configured to generate a combined video, wherein the combined image is a video frame of the combined video.

19. The apparatus of claim 1, wherein, to output the combined image, the one or more processors are configured to send the combined image to a recipient device.

20. The apparatus of claim 1, wherein, to output the combined image, the one or more processors are configured to cause the combined image to be displayed using a display.

21. The apparatus of claim 1, wherein the apparatus includes at least one of a mobile handset, a wireless communication device, and a head-mounted display.

22. A method of image processing, the method comprising:
   receiving an identity image depicting a first person having an identity;
   receiving an attribute image depicting a second person having an attribute;
   receiving a third image depicting a third person having a feature;

using one or more trained machine learning (ML) models to generate a combined image based on the identity image and the attribute image and the third image, wherein the combined image depicts a virtual person having the identity and the attribute and the feature; and
outputting the combined image.

23. The method of claim 22, wherein the feature is an expression.

24. The method of claim 22, wherein the feature is a second attribute.

25. The method of claim 22, wherein the attribute is of an attribute category, wherein the virtual person in the combined image also includes the attribute of the attribute category, wherein the attribute category includes at least one of a facial feature, a characteristic of a facial feature, a worn accessory, a hairstyle, an age, a head pose, a body pose, a facial expression, a gender, or a sex.

26. The method of claim 22, further comprising:
extracting one or more identity features from the identity image using one or more identity encoders; and
extracting one or more attribute features from the identity image using one or more attribute encoders, wherein generating the combined image includes using the one or more identity features and the one or more attribute features as inputs to the one or more trained machine learning (ML) models.

27. The method of claim 22, wherein generating the combined image includes using one or more multi-channel adaptive attentional denormalization (MC-AAD) layers to adjust one or more regions of a face based on at least one of based on one or more features from at least one of the identity image or the attribute image, wherein the one or more MC-AAD layers are associated with the one or more trained machine learning (ML) models.

28. The method of claim 22, wherein generating the combined image includes at least one of denormalizing or renormalizing the identity, the attribute, and the feature using the one or more trained ML models.

29. The method of claim 22, wherein the one or more trained machine learning (ML) models are trained using a cycle-consistency process in which the one or more trained machine learning (ML) models reconstruct one or more source images from one or more previously-combined images previously generated using the one or more trained machine learning (ML) models.

30. The method of claim 22, further comprising:
using the one or more trained ML models to generate, based on the combined image, at least one of a reconstructed identity image or a reconstructed attribute image or a reconstructed third image, wherein the reconstructed identity image is a reconstruction of the identity image based on the combined image, wherein the reconstructed attribute image is a reconstruction of the attribute image based on the combined image, wherein the reconstructed third image is a reconstruction of the third image based on the combined image.

* * * * *